US010176071B1

(12) United States Patent
Ohsie et al.

(10) Patent No.: US 10,176,071 B1
(45) Date of Patent: Jan. 8, 2019

(54) METHODS AND APPARATUS FOR SYSTEMS DETERMINING A PROBABLE SET OF PROBLEMS TO EXPLAIN SYMPTOMS

(71) Applicant: EMC CORPORATION, Hopkinton, MA (US)

(72) Inventors: David Ohsie, Baltimore, MD (US); Cheuk Lam, Yorktown Heights, NY (US)

(73) Assignee: EMC IP Holding Company LLC, Hopkinton, MA (US)

( * ) Notice: Subject to any disclaimer, the term of this patent is extended or adjusted under 35 U.S.C. 154(b) by 570 days.

(21) Appl. No.: 14/674,134

(22) Filed: Mar. 31, 2015

(51) Int. Cl.
*G06F 11/30* (2006.01)
*G06F 11/34* (2006.01)

(52) U.S. Cl.
CPC ...... *G06F 11/3034* (2013.01); *G06F 11/3409* (2013.01); *G06F 11/3452* (2013.01)

(58) Field of Classification Search
CPC .......................... G06F 11/3036; G06F 11/3409
USPC ......................................................... 702/185
See application file for complete search history.

(56) References Cited

U.S. PATENT DOCUMENTS

| | | | |
|---|---|---|---|
| 5,528,156 A * | 6/1996 | Ueda .................... | G01R 31/307 324/754.19 |
| 6,249,755 B1 | 6/2001 | Yemini et al. | |
| 6,493,804 B1 * | 12/2002 | Soltis .................. | G06F 12/0815 707/999.009 |
| 7,065,467 B1 | 6/2006 | Ohsie et al. | |
| 7,107,185 B1 * | 9/2006 | Yemini ................ | G06F 11/2257 702/181 |
| 7,337,090 B1 * | 2/2008 | Yemini ................ | G06F 11/2257 702/181 |
| 8,031,634 B1 | 10/2011 | Artzi et al. | |
| 8,443,153 B1 * | 5/2013 | Edwards ........... | G06F 17/30091 711/147 |
| 8,793,283 B1 | 7/2014 | Austern et al. | |
| 8,819,078 B2 | 8/2014 | Roy et al. | |
| 9,053,000 B1 | 6/2015 | Lam et al. | |
| 2008/0133187 A1 * | 6/2008 | Smith ..................... | G06F 17/50 703/2 |
| 2009/0047677 A1 * | 2/2009 | Frasch .................... | G06F 19/24 435/6.18 |
| 2011/0296361 A1 * | 12/2011 | Tanaka ................ | G06F 17/5031 716/108 |
| 2012/0221314 A1 | 8/2012 | Bourlatchkov et al. | |
| 2012/0297061 A1 | 11/2012 | Pedigo et al. | |

(Continued)

FOREIGN PATENT DOCUMENTS

WO    WO 2012/150375    11/2012

OTHER PUBLICATIONS

U.S. Appl. No. 15/393,337, filed Dec. 29, 2016, Gal et al.
(Continued)

*Primary Examiner* — Igwe U Anya
(74) *Attorney, Agent, or Firm* — Daly, Crowley Mofford & Durkee, LLP

(57) ABSTRACT

Methods and apparatus for performing event correlation using codebook processing including determining a most probable set of problems for observed symptoms in a system. In embodiments, a correlation matrix is received which has managed objects. Hypotheses are defined as a subset of problems having observed symptoms based on the correlation matrix and evaluated.

20 Claims, 49 Drawing Sheets

(56) References Cited

U.S. PATENT DOCUMENTS

| | | | |
|---|---|---|---|
| 2013/0166724 A1 | 6/2013 | Bairavasundaram et al. | |
| 2013/0297869 A1* | 11/2013 | Mills | G06F 3/0674 711/112 |
| 2014/0195847 A1 | 7/2014 | Webman et al. | |
| 2014/0337431 A1 | 11/2014 | Naseh et al. | |
| 2014/0344230 A1 | 11/2014 | Krause et al. | |
| 2016/0026631 A1 | 1/2016 | Salam et al. | |

OTHER PUBLICATIONS

Ohsie, "Modeled abductive Inference for Event Management and Correlation" Thesis; for Columbia University; Jan. 1998; 254 pages.
Non-Final Office Action dated May 17, 2017 from U.S. Appl. No. 14/674,128; 19 Pages.
U.S. Appl. No. 13/435,017, filed Mar. 30, 2012, He, et al.
U.S. Appl. No. 13/536,512, filed Jun. 28, 2012, Zhang, et al.
U.S. Appl. No. 13/536,726, filed Jun. 28, 2012, Lam, et al.
U.S. Appl. No. 14/674,087, filed Mar. 31, 2015, Ohsie et al.
U.S. Appl. No. 14/674,128, filed Mar. 31, 2015, Ohsie et al.
Best Practices for Deploying VMware vCloud Director on Vblock Infrastructure Platforms, Sep. 2011, The Virtual Computing Environment Company, www.vce.Com, 20 pages.
Cisco Unified Computing System and EMC VNXe3300 Unified Storage System, White Paper, Jan. 2011, Revision 1.0, $EMC^2$, Cisco Systems, Inc., 170 West Tasman Drive, San Jose, CA 95134-1706, www.cisco.com, 9 pages.
EMC Compute-As-A-Service—Design Principles and Considerations for Deployment, VCE Vblock, VMware vCloud Director, EMC Solutions Group, Dec. 2011, EMC White Paper, 58 pages.
EMC Integrated Infrastructure for VMware Enabled by EMC VNXe3100 and VMware vSphere 4.1, An Architectural Overview, White Paper, EMC Global Solutions, $EMC^2$, Feb. 2011, 24 pages.
EMC Scaleio Architectural and Functional Overview, Dec. 2013, EMC White Paper, 13 pages.
Malewicz et al., "Pregel: A System for Large-Scale Graph Processing", SIGMOD'10, Jun. 6-11, 2010, Indianapolis, Indiana, p. 135-145, 11 pages. ACM 978-1-4503-0032-2/10/06.
Service Catalog Strategies for Vblock™ Infrastructure Platforms, IaaS COE, Jan. 2011, The Virtual Computing Environment Company, www.vce.com, 19 pages.
Unified Infrastructure Manager/Provisioning, © 2011 VCE Company, The Virtual Computing Environment Company, www.vce.com, 3 pages.
Vblock Infrastructure Platforms Series 300 Architecture Overview, Version 2.4, Aug. 2011, The Virtual Computing Environment Company, www.vce.com, 74 pages.
Vblock™ Infrastructure Platforms 2010 Vblock Platforms Architecture Overview, Version 1.3, Nov. 2011, The Virtual Computing Environment Company, www.vce.com, 25 pages.
Vblock™ Infrastructure Platforms Technical Overview, © VCE Company, The Virtual Computing Environment Company, www.vce.com, 8 pages.
Vblock™ Solution for Trusted Multi-Tenancy: Technical Overview, Aug. 2011, The Virtual Computing Environment Company, www.vce.com, 76 pages.
VMware vStorage APIs for Array Integration with EMC VNX Series for NAS, Benefits of EMC VNX for File Integration with VMware VAAI, White Paper, EMC Solutions Group, Jan. 2012, $EMC^2$, 17 pages.
Response to Office Action dated Jul. 25, 2017 from U.S. Appl. No. 14/674,087, filed Oct. 24, 2017; 10 Pages.
Response to U.S. Non-Final Office Action dated May 17, 2017 for U.S. Appl. No. 14/674,128; Response filed on Jun. 8, 2017; 13 Pages.
Notice of Allowance dated Jun. 30, 2017 for U.S. Appl. No. 14/674,128; 5 Pages.
U.S. Preliminary Amendment filed May 8, 2018 for U.S. Appl. No. 15/784,334; 8 Pages.
U.S. Non-Final Office Action dated Jul. 25, 2017 for U.S. Appl. No. 14/674,087; 20 Pages.
U.S. Notice of Allowance dated Dec. 14, 2017 corresponding to U.S. Appl. No. 14/674,087; 10 Pages.

* cited by examiner

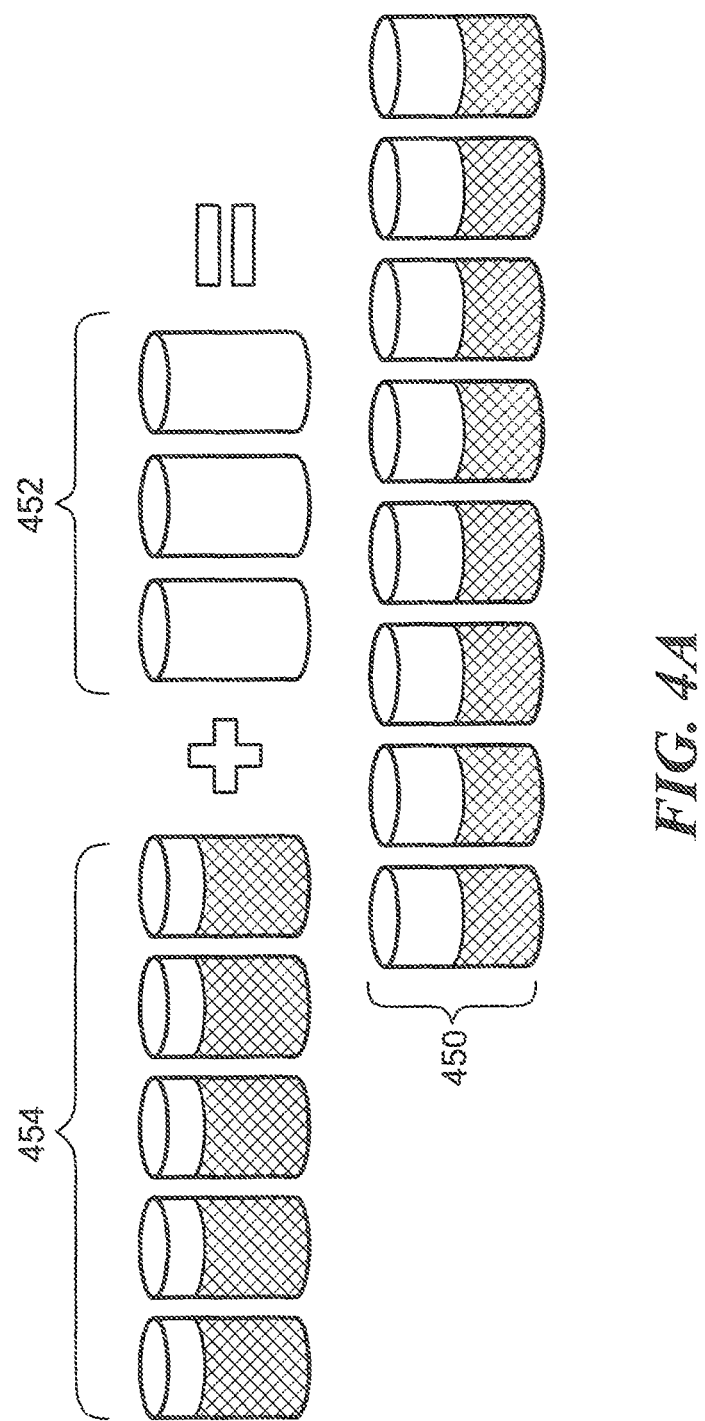

METHODS AND APPARATUS FOR SYSTEMS DETERMINING A PROBABLE SET OF PROBLEMS TO EXPLAIN SYMPTOMS

BACKGROUND

As is known in the art, management applications may have a requirement for near-real time monitoring of the state of a datacenter and its applications. For example, one monitoring requirement in a data center environment is continuous monitoring of the sum of the read bandwidth on storage volumes exposed by a particular storage pool or virtual array. These values can be defined over the underlying metrics.

SUMMARY

In embodiments, operational management of a datacenter requires a continuous updating of the current state of the datacenter. A system determines the current state processes expressions from various input. A first set of inputs includes topological data representing the variety of managed objects in the datacenter. The first set of inputs can be represented by a dynamic graph. A second set of inputs can include a stream of telemetry data from the managed objects in the datacenter. The expressions to determine the current state of the datacenter are continuously evaluated against a changing graph and the telemetry data stream in near-real time.

In embodiments, the topology can scale to a total of the sizes of the datacenters under management using a scalable expression engine for processing streams in a scalable and fault tolerant manner. In one embodiment, vertex centric programming decomposes graph processing for scaling to large compute clusters. In one particular embodiment, the requirements of an expression engine are mapped onto a vertex centric programming framework.

In one aspect of the invention, a method of performing event correlation using codebook processing including determining a most probable set of problems for a observed symptoms in a system, comprises: receiving a correlation matrix for the system; defining hypotheses as a subset of problems having observed symptoms based on the correlation matrix, wherein there is a causal probability from problem set to symptoms; determining a partial relative probability for each of the problems by parallel vertex processing including: for each incoming edge for a problem vertex, determining the partial relative probability from the symptom and the problem for the problem vertex; sending messages that include the determined partial relative probability; and combining messages for the same problem vertex by multiplication.

In another aspect of the invention, a system for performing event correlation using codebook processing including determining a most probable set of problems for a observed symptoms in a system, comprises: a memory and a processor configured to: receive a correlation matrix for the system; define hypotheses as a subset of problems having observed symptoms based on the correlation matrix, wherein there is a causal probability from problem set to symptoms; determine a partial relative probability for each of the problems by parallel vertex processing including: for each incoming edge for a problem vertex, determine the partial relative probability from the symptom and the problem for the problem vertex; send messages that include the determined partial relative probability; and combine messages for the same problem vertex by multiplication.

In a further aspect of the invention, an article, comprises: a non-transitory storage medium comprising stored instructions that enable a system for performing event correlation using codebook processing including determining a most probable set of problems for a observed symptoms in a system, to: receive a correlation matrix for the system; define hypotheses as a subset of problems having observed symptoms based on the correlation matrix, wherein there is a causal probability from problem set to symptoms; determine a partial relative probability for each of the problems by parallel vertex processing including: for each incoming edge for a problem vertex, determine the partial relative probability from the symptom and the problem for the problem vertex; send messages that include the determined partial relative probability; and combine messages for the same problem vertex by multiplication.

BRIEF DESCRIPTION OF THE DRAWINGS

The foregoing features of this invention, as well as the invention itself, may be more fully understood from the following description of the drawings in which:

FIG. 4A is a schematic representation of adding storage and rebalancing stored data;

DETAILED DESCRIPTION

Figure 1:
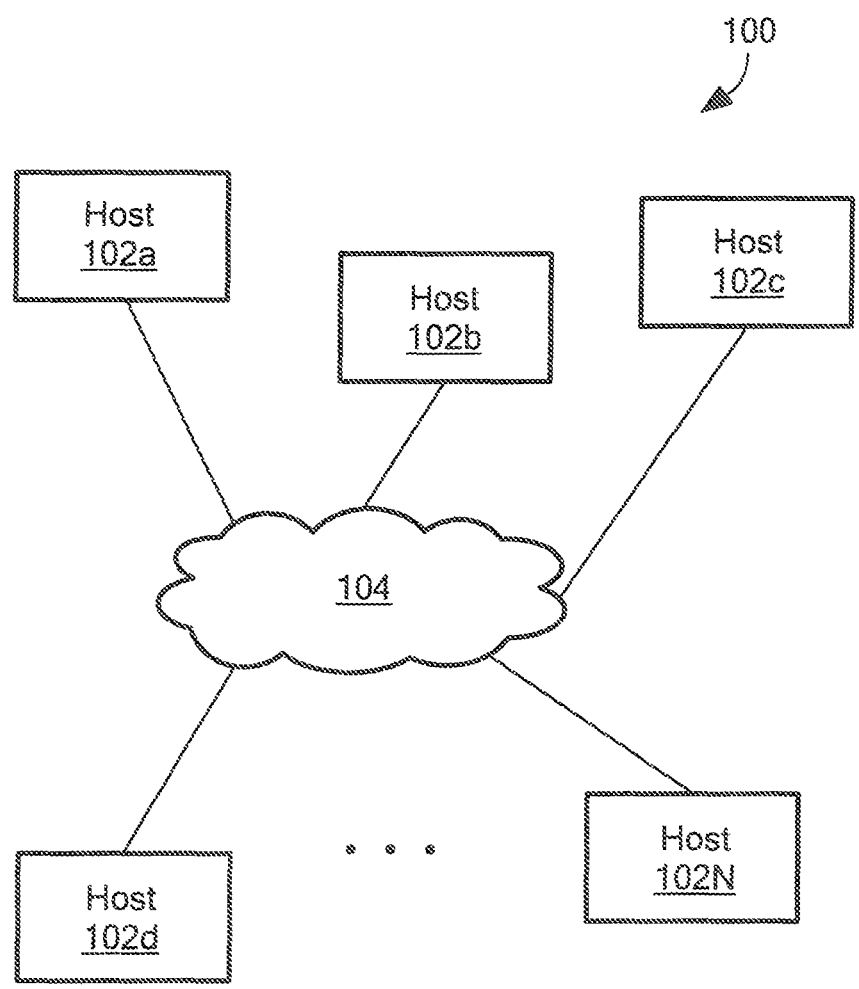
FIG. 1 is a schematic representation of a system capable of facilitating message passing for graph-based processing.

FIG. 1 shows an illustrative system 100 that can be used to run distributed expression evaluation processing to determine the state of the system. In illustrative embodiments, the system 100 can comprise a datacenter environment. The system 100 includes a series of hosts 102a-N coupled to each other via a network 104. The hosts 102 have storage that can be shared with other hosts. The hosts can run various applications including databases, hypervisors, etc. As described more fully below, messages can be exchanged and processed to determine a state of the system.

Figure 2A:
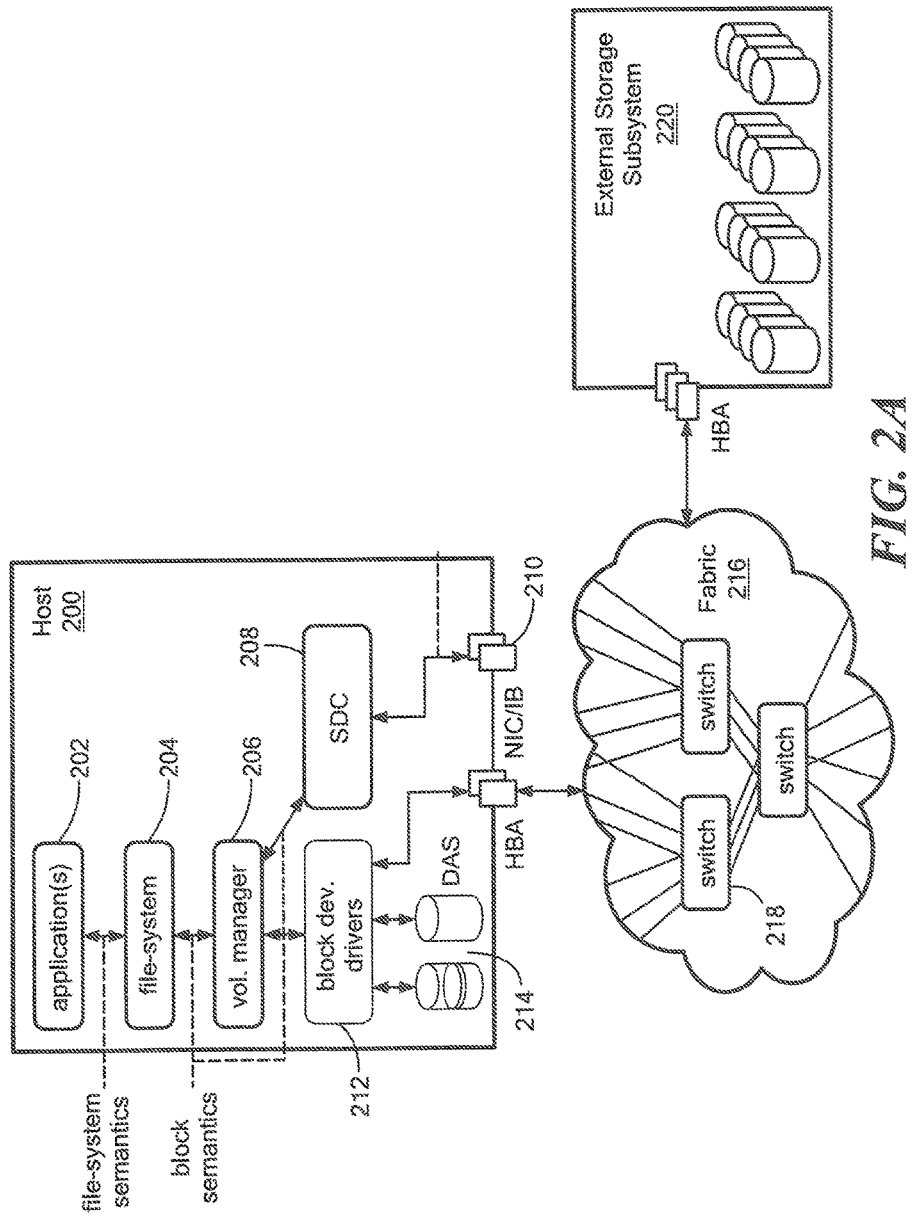
FIG. 2A is a schematic diagram of a system having elastic converged storage including a host having a storage data client module.

FIG. 2A shows an illustrative host 200 having an application 202, file system 204, and volume manager 206 coupled in a manner well known in the art. The host 200 further includes an elastic storage data client module 208 coupled to the volume manager 206 and to a NIC/IB interface 210. The host 200 further includes block device drivers 212 and direct-attached storage (DAS) 214. The host 200 can be coupled to a switch fabric 216 having any practical number of switches 218. An external storage system 220 can also be coupled to the fabric 216

Figure 2B:
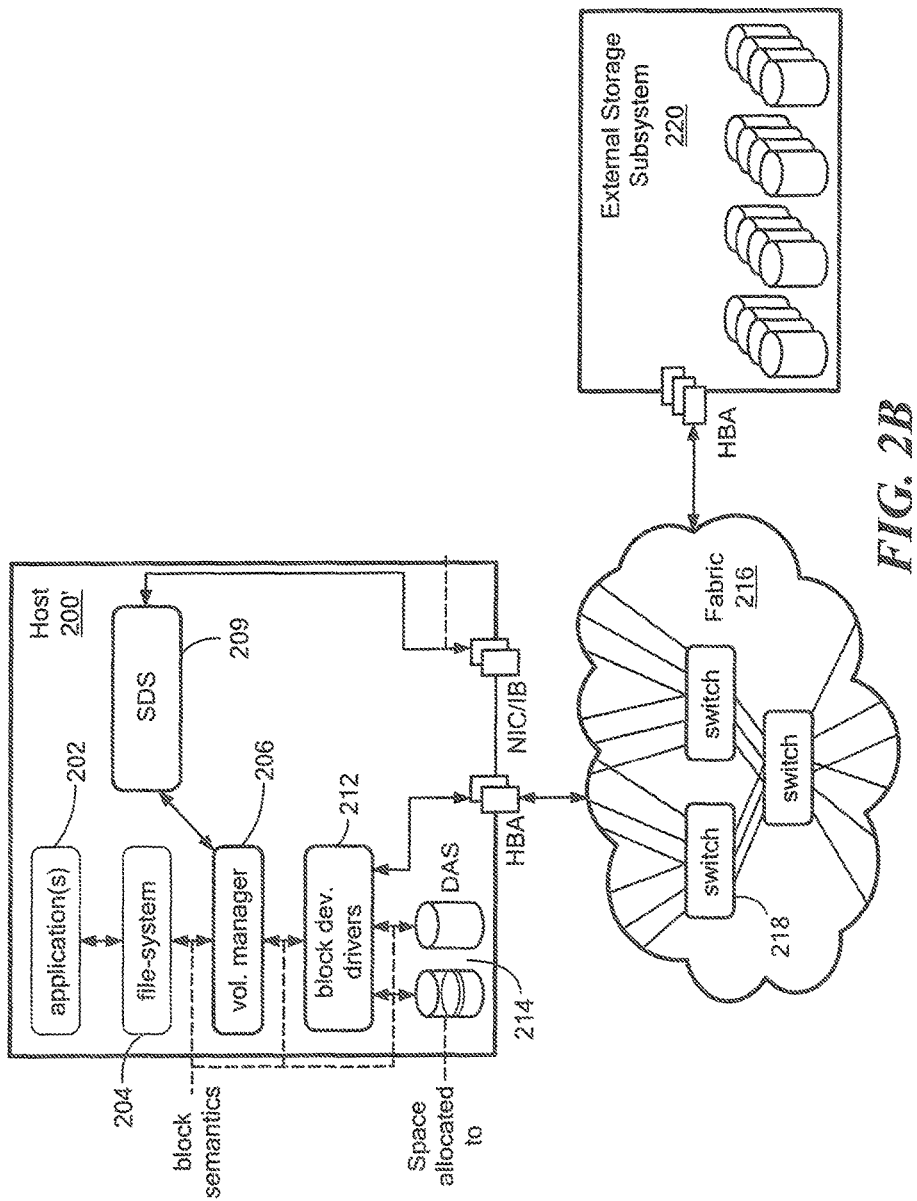
FIG. 2B is a schematic diagram of a system having elastic converged storage including a host having a storage data server module.

FIG. 2B shows a host 200' having commonality with host 200 of FIG. 2A with an elastic storage data server module 209, which 'owns' local storage 214 that can contribute to storage pools for the elastic storage. In one embodiment, the elastic storage data server 209 is provided as a daemon/service. It is understood that the local storage 214 can be provided as dedicated disks, partitions within disks, files, etc.

Figure 2C:
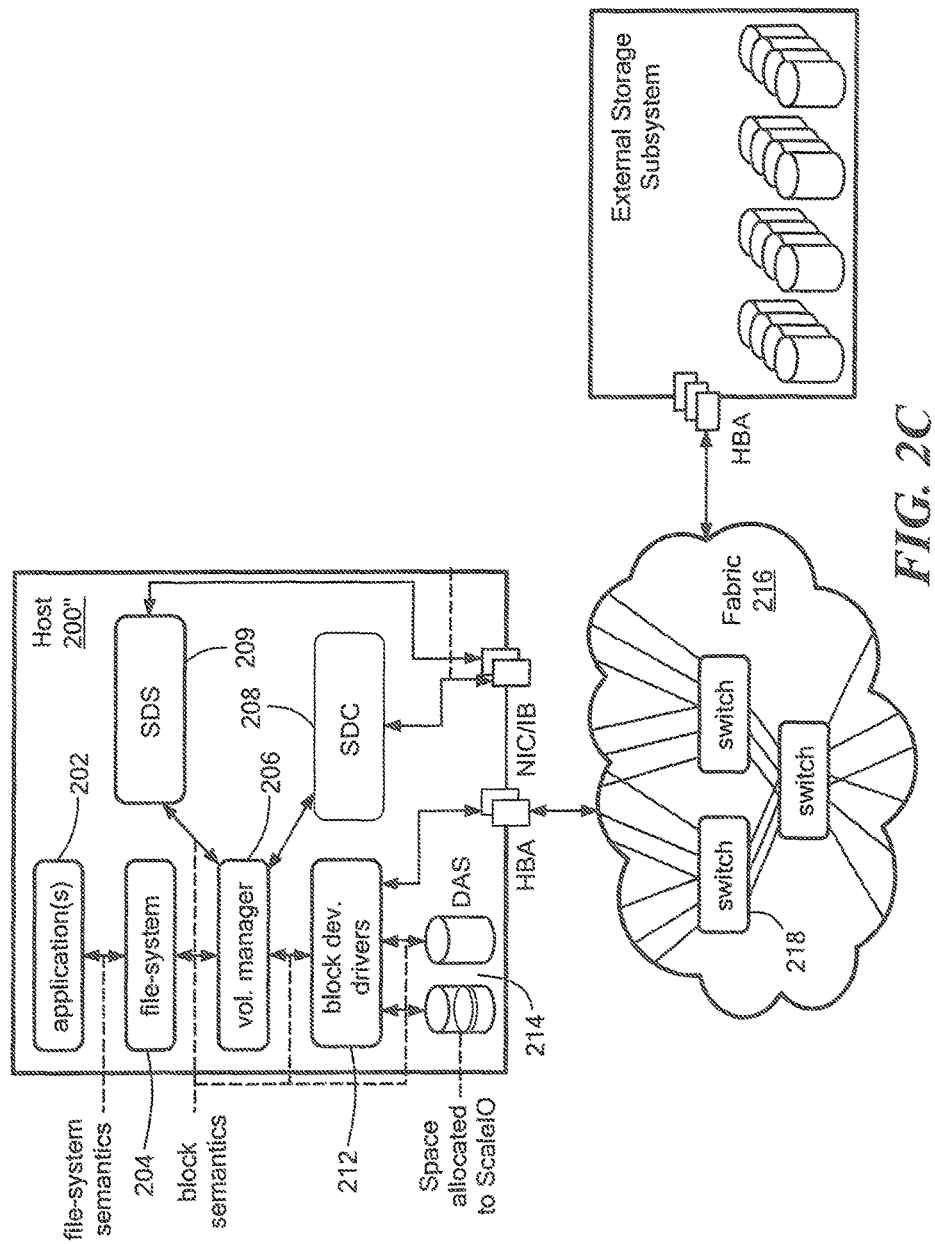
FIG. 2C is a schematic diagram of a system having elastic converged storage including a host having storage data client and storage data server modules.

FIG. 2C shows a host 200" having an elastic storage data client 208, which serves the IO requests of the host applications, and an elastic storage data server 216, which serves the IO requests of the various remote elastic data clients.

Figure 3A:
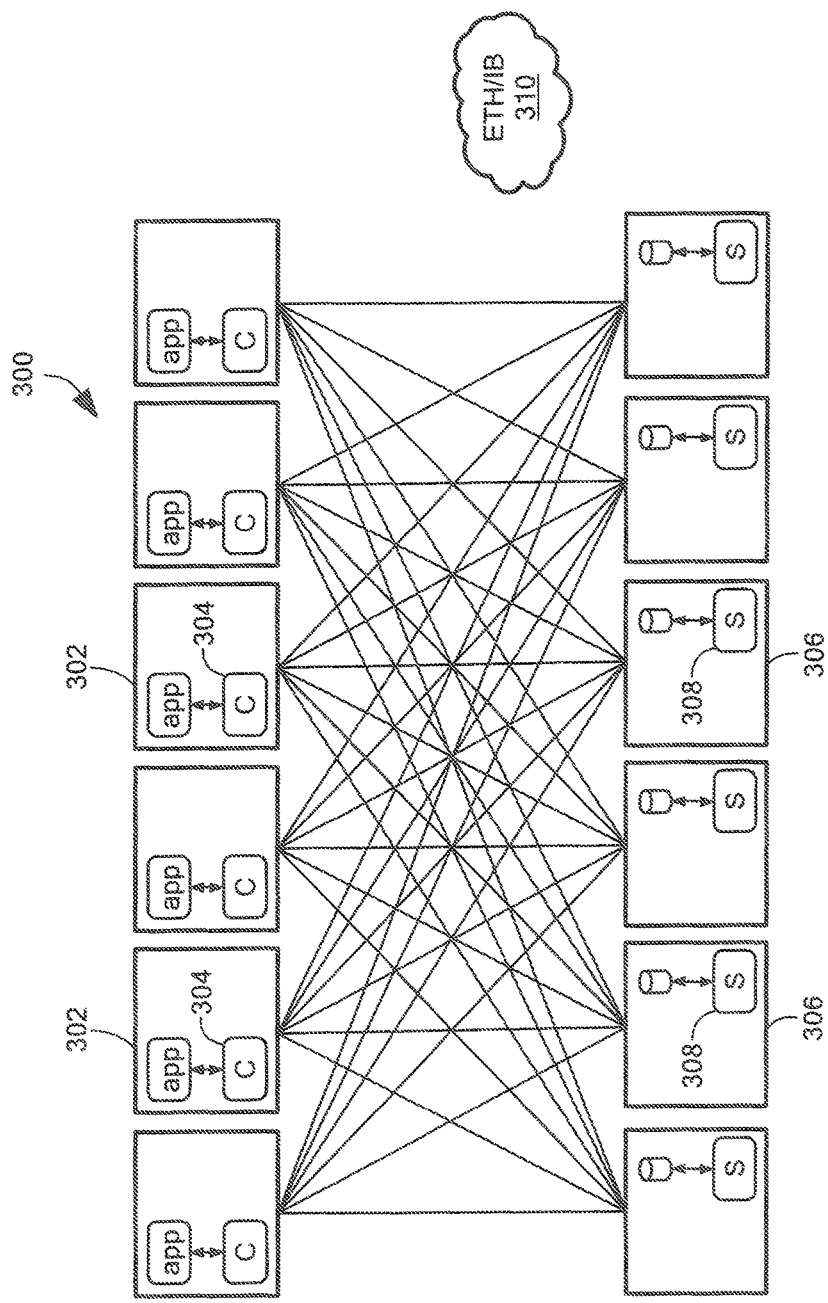
FIG. 3A is a schematic representation of a system having hosts connected in parallel.
Figure 3B:
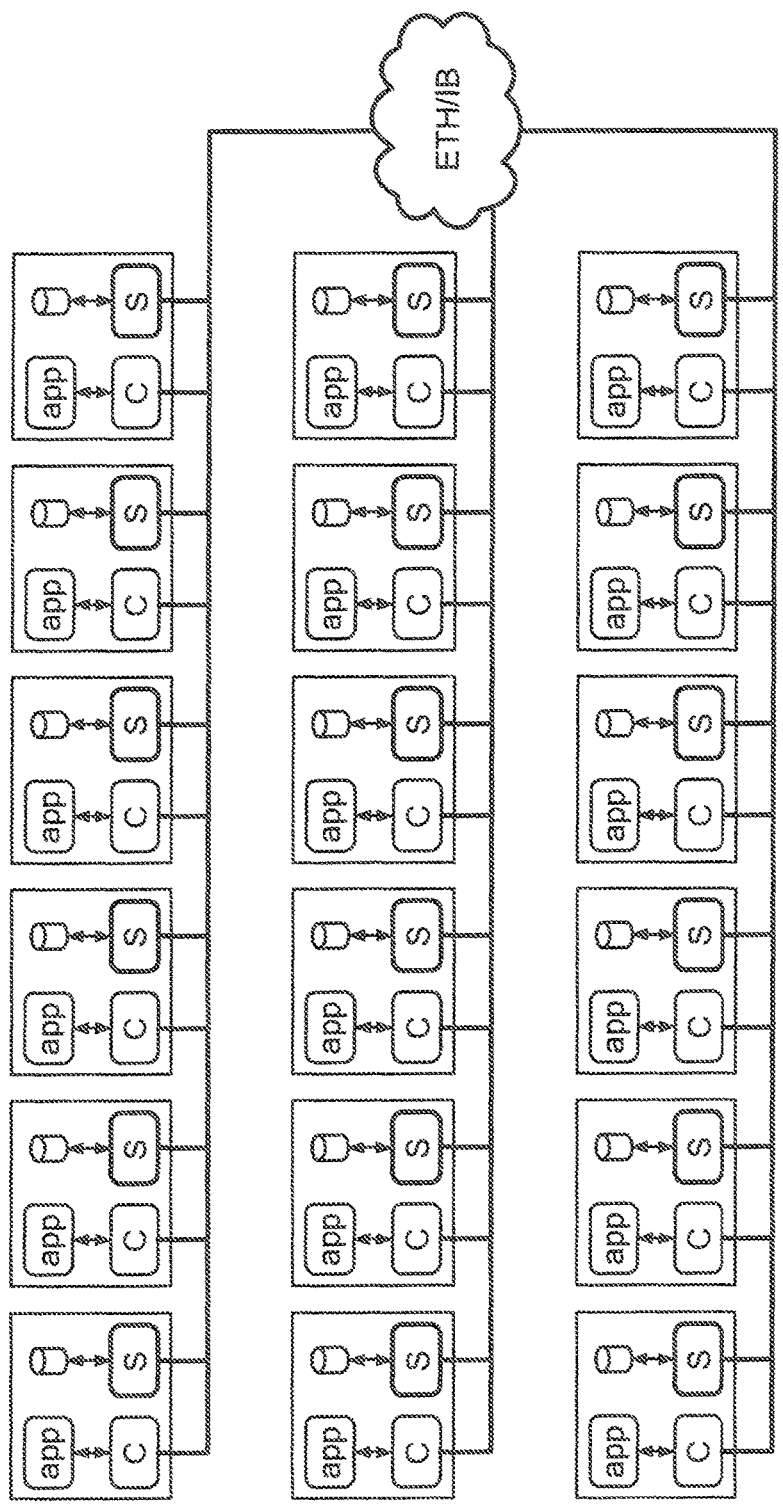
FIG. 3B is a schematic representation of a system having hosts in a two layer configuration.

FIG. 3A shows an illustrative system 300 having a two-layer configuration with hosts 302 having elastic storage data client modules 304 coupled to hosts 306 having elastic storage server modules 308 to provide parallelism. The storage data client modules 304 contact the relevant storage data server modules 308 directly via the fabric 310. It is understood that a mixture of hosts having data clients and servers and both can be coupled. It is further understood that the storage be asymmetric, e.g., different number spindles, etc. FIG. 3B shows a similar system of hosts with a different network layout and configuration.

Figure 4:
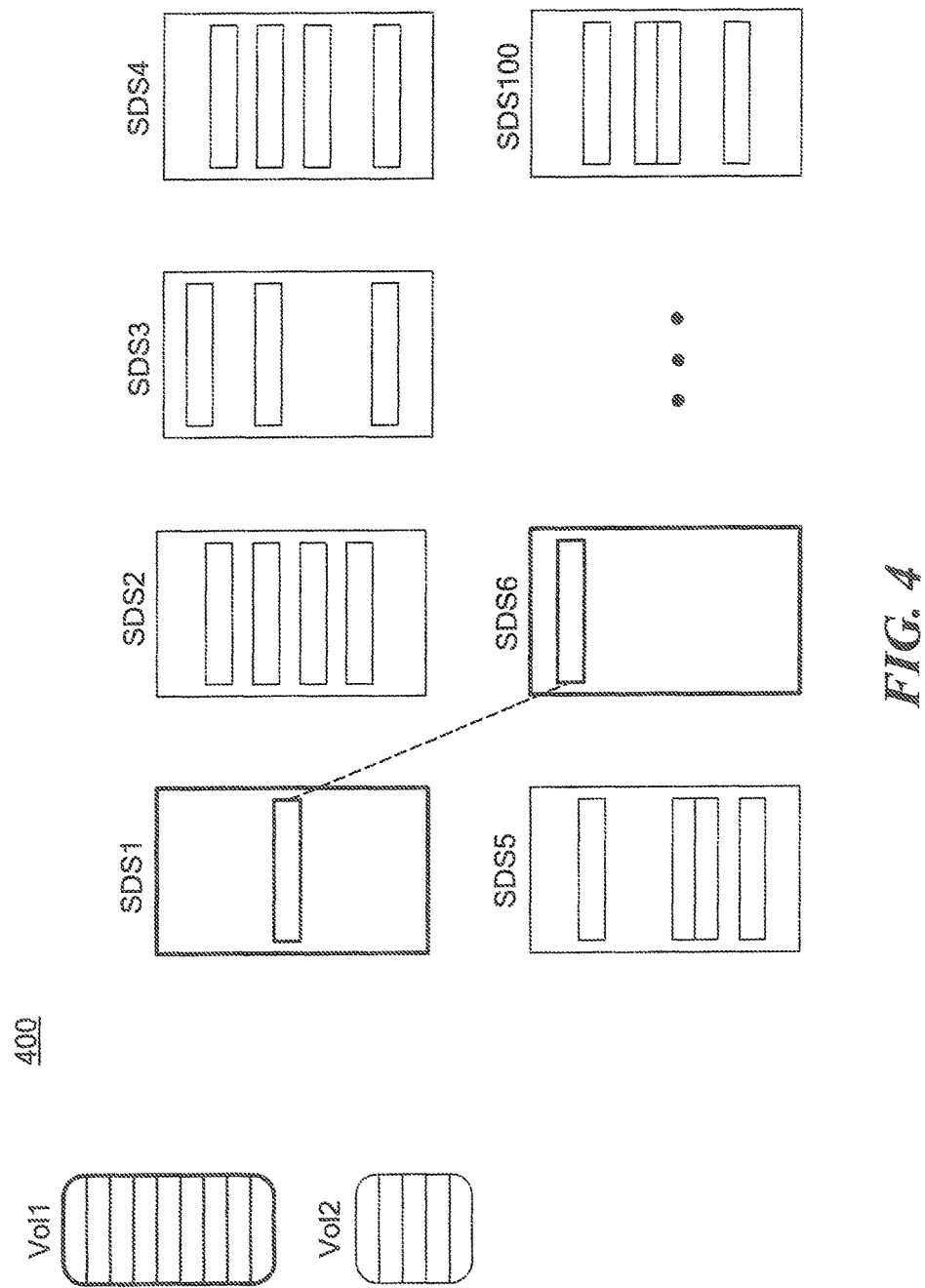
FIG. 4 is a schematic representation of a system having elastic converged storage with mirroring.

FIG. 4 shows an illustrative volume layout 400 for various servers and clients. As can be seen, volume 1 and volume 2 are spread out across a cluster of storage data servers SDS1-SDS100 in a balanced manner to minimize hot spots and IO splitting. It is understood that data mirroring, which can be distributed throughout the cluster, can be provided for redundancy to prevent data loss from disk failure. In embodiments, hosts and disks can be added and removed dynamically and that rebalancing can be performed, such as in a many-to-many manner. FIG. 4A shows an illustrative rebalancing of data 450 when additional storage 452 is provided to existing storage 454.

Figure 5:
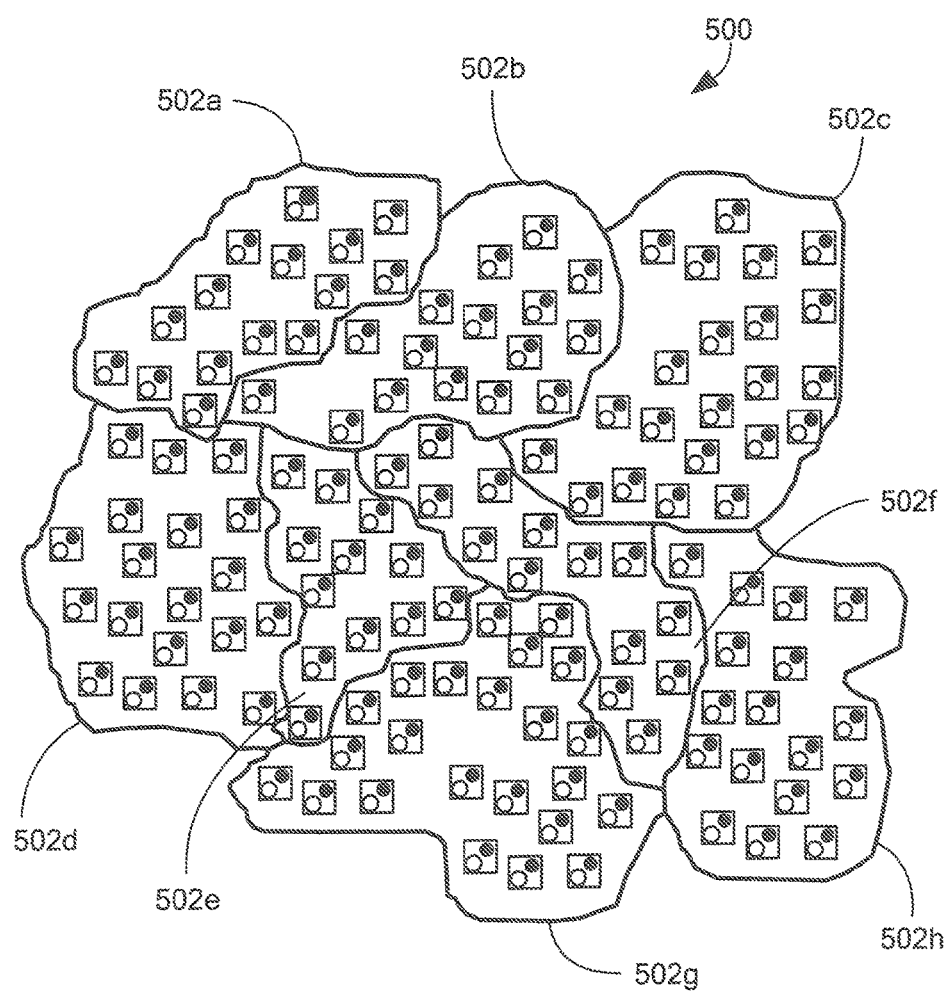
FIG. 5 is a schematic representation of a system having protection domains.

FIG. 5 shows a datacenter environment 500 having hosts with elastic storage clients and/or servers grouped in protection zones or domains 502a-h of elastic data servers. In embodiments, a given volume is defined in a given protection domain. Clients in a first domain can access data in a second domain. In embodiments, a data server resides in one particular protection domain. In general, resources can be moved from one protection zone to another without disruption.

Figure 5A:
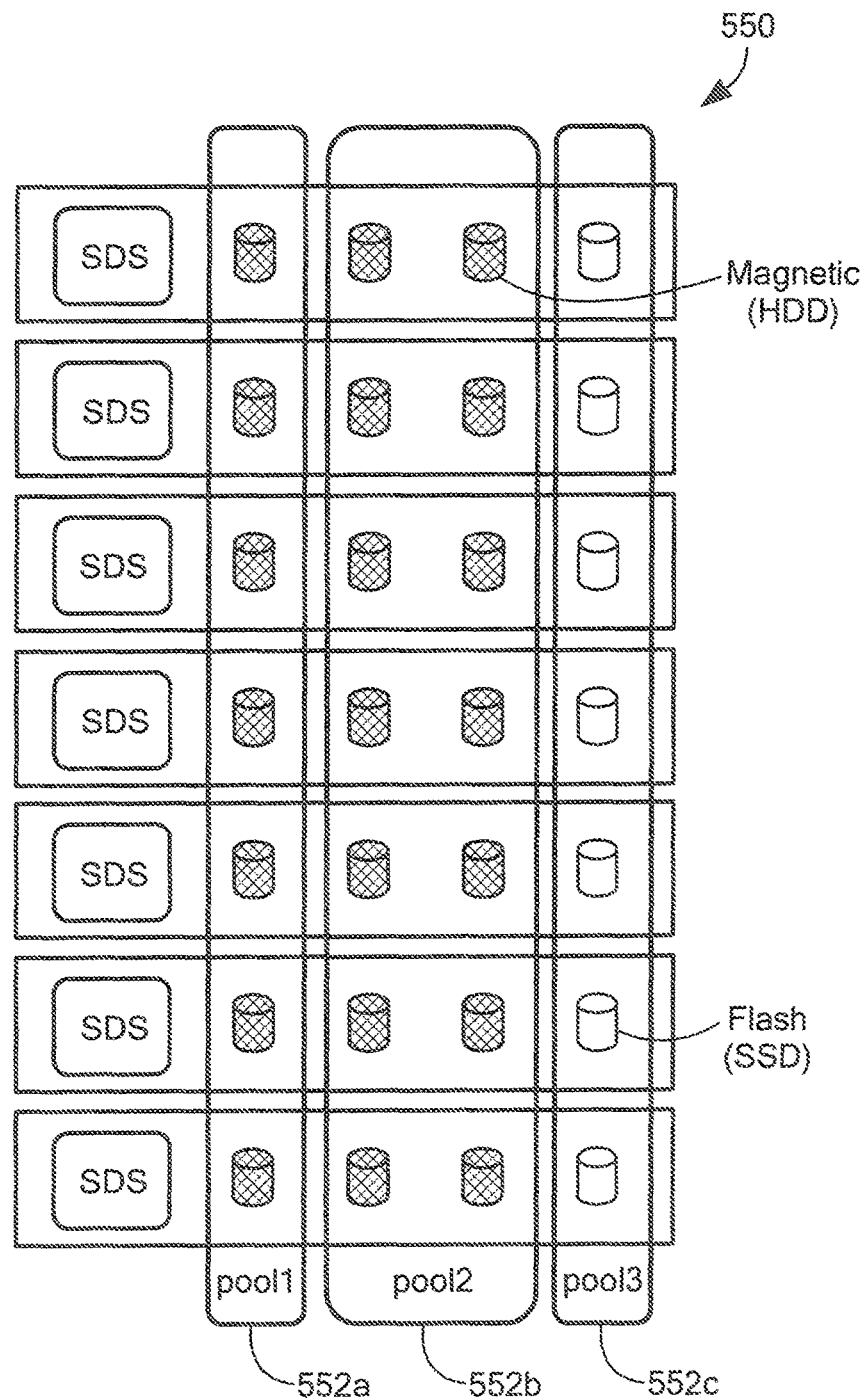
FIG. 5A is a schematic representation of a storage pools in a system having elastic converged storage.

FIG. 5A shows illustrative protection zone 550 having storage pools 552a-c formed from storage of the data server modules 554. First storage pool 552a can be provided as directed attached storage, second storage pool 552b can be provided as magnetic (HDD), and third storage pool can be provided as flash (SDD) 552c. For performance isolation, multiple storage pools can have the same media speed. In an asymmetric configuration, storage pools can have different numbers of spindles per data server, etc. It is understood that any practical number of storage pools can be formed.

Figure 6:
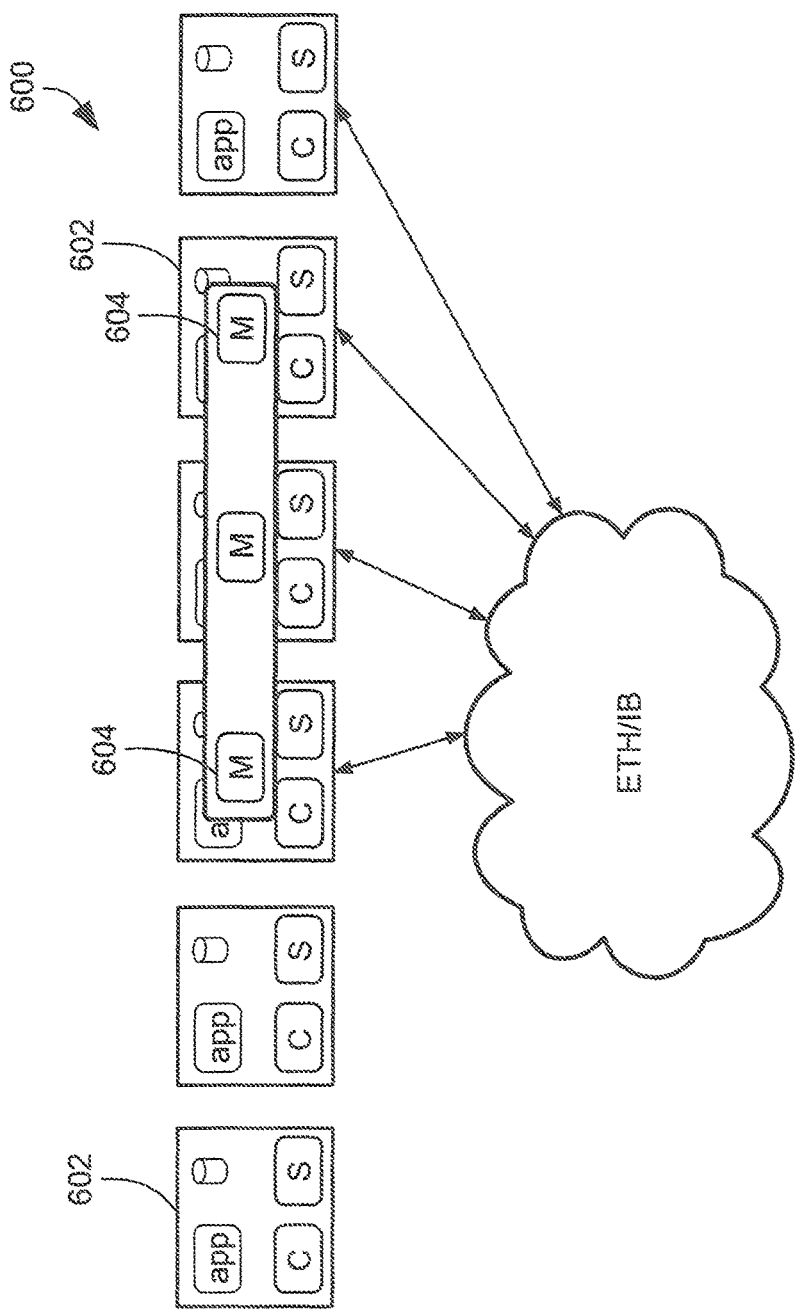
FIG. 6 is a schematic representation of a system having metadata management modules.

FIG. 6 shows a system 600 in which some of the hosts 602 includes a metadata manager module 604 to enable nodes to know which nodes need to communicate. The metadata modules 604 store mapping and storage ownership information and enabling remapping of storage and storage migration, for example. In embodiments, user data does not pass through the metadata modules 604. U.S. Patent Publication No. 2014/0195847, which is incorporated herein, discloses further detail of an illustrative elastic converged storage system in which expression evaluation can be performed to determine states of the system. It is understood that the above configurations, changes, rebalancing, and reconfiguration result in changes in the states of the system.

As described below, a domain model can be established to describe such a system, and expression evaluation using vertex-centric processing model determine the states of the system.

In one aspect of the invention, for management of systems as described above, as well as other types of systems, it is desirable to provide real-time monitoring of the state of the system and its applications. A system can be provided as a datacenter environment having dynamic operation. In general, given some input data from the systems under management, the system should determine a value of an expression or graph of expressions and notify a management module of changes to such expression values. For example, one requirement of a system having elastic converged storage can comprise continuous monitoring of the sum of a read bandwidth (ReadBW) on storage volumes exposed by a particular storage pool and/or protection domain. These values can be defined as graph of expressions over the underlying metrics. It will be appreciated that large quantities of data (e.g. up to 30,000,000 metrics in a single system) should be processed at fast monitoring intervals (e.g., 5 seconds).

Figure 7:
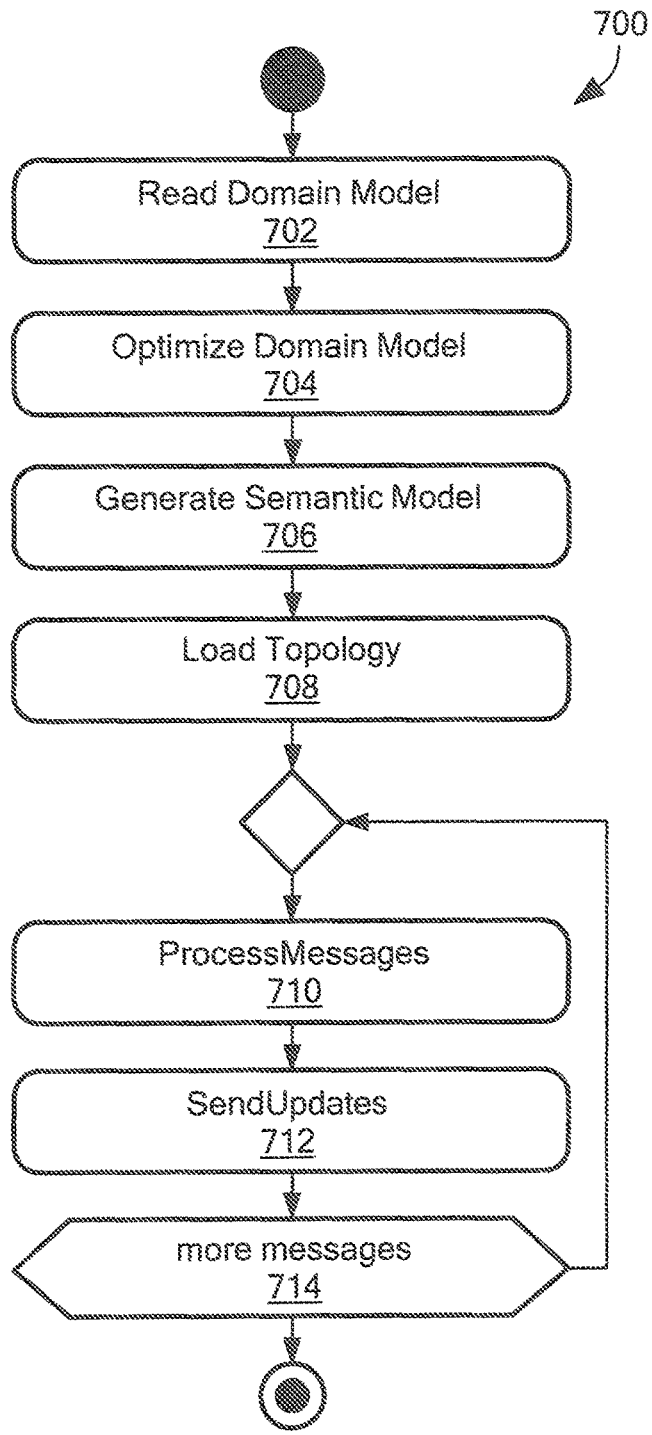
FIG. 7 is a high level flow diagram for propagating and computing expressions in a system using vertex-centric graph-based processing.

FIG. 7 shows an illustrative top level work flow 700 of expression evaluation implemented by iterative graph processing. In step 702, a domain model is read and in step 704, the domain model is optimized. In embodiments, the domain corresponds to a collection of classes, such as protection domain 502 in FIG. 5, SDS, and SDC, etc. In step 706, a semantic model is generated and in step 708 the topology is loaded. In step 710, messages are processed and in step 712, updates are transmitted to update the state of the system, as described more fully below. In step 714, additional messages are received and processing continues in step 710.

In step 702 above, the system reads the domain model, which can be represented in textual form as follows:

| Domain Model Textual Representation |
|---|
| class TTL { <br>   computed AvgDevReadBW = avg(Child->VPool::AvgDevReadBW) <br>   computed TotalClientReadBW = sum(Child->VPool::TotalClientReadBW) <br>   computed TotalServerReadBW = sum(Child->StorageSystem::TotalReadBW) <br>   relationship Child, SDC(200,000) <br>   shared relationship Child, StorageSystem(10) <br> } <br> class SDC { <br>   TotalReadBW = sum(Child->VCMAP::ReadBW) <br>   shared relationship Child, VCMAP(5) <br> } <br> class VCMAP { <br>   external ReadBW <br> } <br> class StorageSystem { <br>   computed TotalReadBW = sum(Child->VArray::ReadBW) <br>   computed AvgDevReadBW = avg(Child->VArray::AvgDevReadBW) <br>   relationship Child, ProtectionDomain(100) <br> } <br> class ProtectionDomain { <br>   computed AvgDevReadBW = avg(Child->VPool::AvgDevReadBW) <br>   computed TotalReadBW = sum(Child->VPool::TotalReadBW) <br>   computed PotentialDataLoss = sum(Child->SDS::UnavailableDeviceCount) >= 2 <br>   shared relationship Child, SDS(100) <br>   shared relationship Child, StoragePool(5) <br> } <br> class StoragePool { <br>   computed AvgDevReadBW = avg(Child->SDS::AvgDevReadBW) <br>   computed TotalReadBW = sum(Child->V-Tree::TotalReadBW) <br>   shared relationship Child, StorageDevice(640) <br>   relationship Child, V-Tree(50) <br> } |

| Domain Model Textual Representation |
|---|
| class SDS { <br>   AvgDevRead6W = avg(Child->StorageDevice::Read6W) <br>   UnavailableDeviceCount = sum(Child->StorageDevice::IsUnavailable) <br>   relationship Child, StorageDevice(32) <br> } <br> class StorageDevice { <br>   external Read6W <br>   external IsUnavailable <br> } <br> class V-Tree { <br>   computed TotalRead6W = sum(Child->Volume::Read6W) <br>   shared relationship Child, Volume(10) <br> } <br> class Volume { <br>   computed TotalRead6W = sum(Child->VCMAP::Read6W) <br>   relationship Child, VCMAP(4) <br> } |

Figure 8:
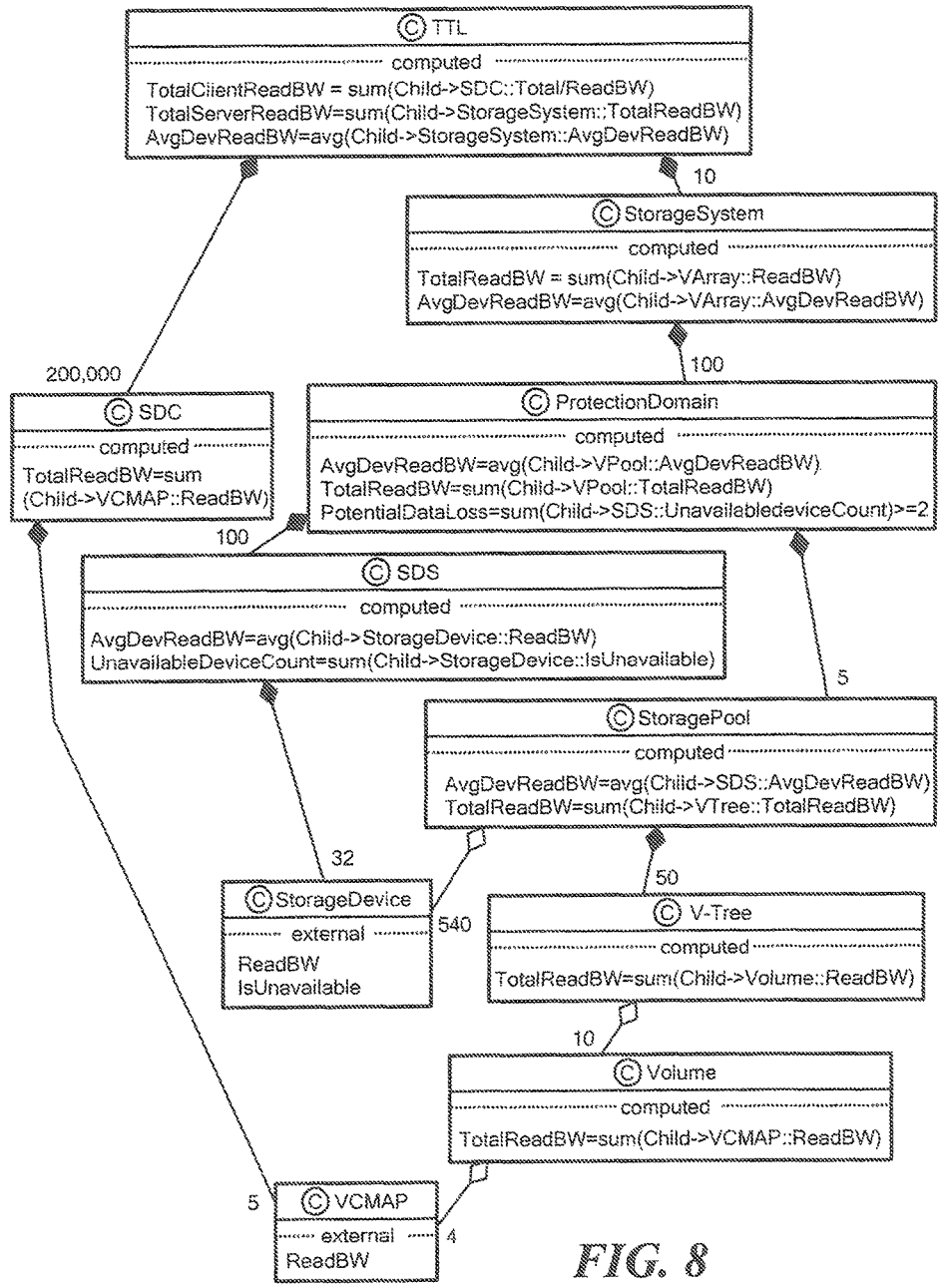
FIG. 8 is a graphical representation of a system domain model.

The above domain model is represented in FIG. 8.

As can be seen above, the domain model comprises a number of classes, where each class contains a set of attributes, such as a "relationship," "external," and "computed." A relationship can include a cardinality (the expected size of the relationship) as well as a hint as to whether the two classes on either end of the relationship should share a vertex representation. In embodiments, the hint is used for optimizing the computation as described below. Relationships are fed to the system as an external input where an external attribute represents a value fed to the system as an external input. A computed attribute represents a computation as the external attributes are updated.

Figure 8A:
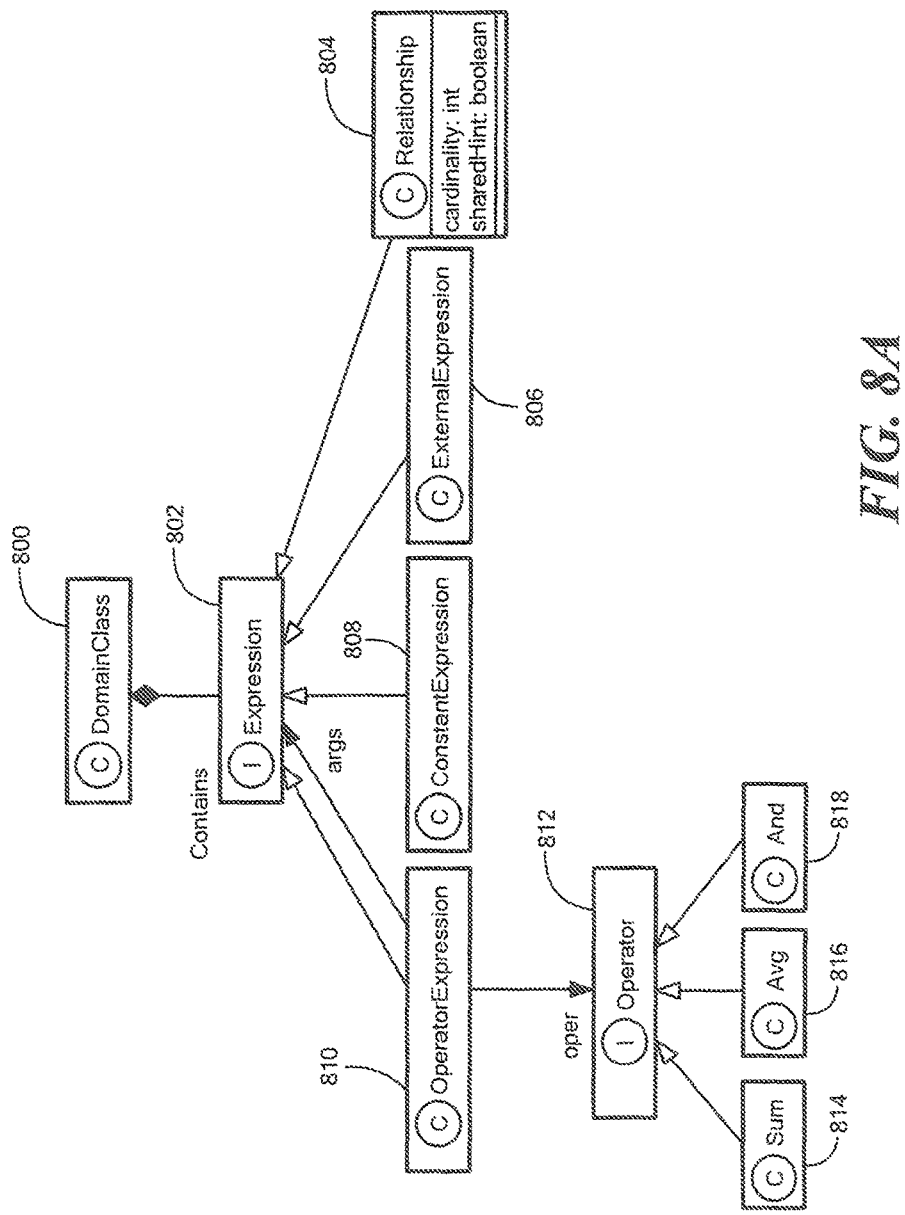
FIG. 8A is a representation of a metamodel for a domain model.

FIG. 8A shows an illustrative domain metamodel that is depicted graphically. The domain class 800 includes zero or more expressions 802 which can comprise a relationship 804, which can include a cardinality and a Boolean hint; an external expression 806; a constant expression 808; or an operator expression 810 having operators 812, such as sum 814, average 816 and logical AND 818, all of which provide information to an expression attribute. It is understood that this model is illustrative.

Figure 9:
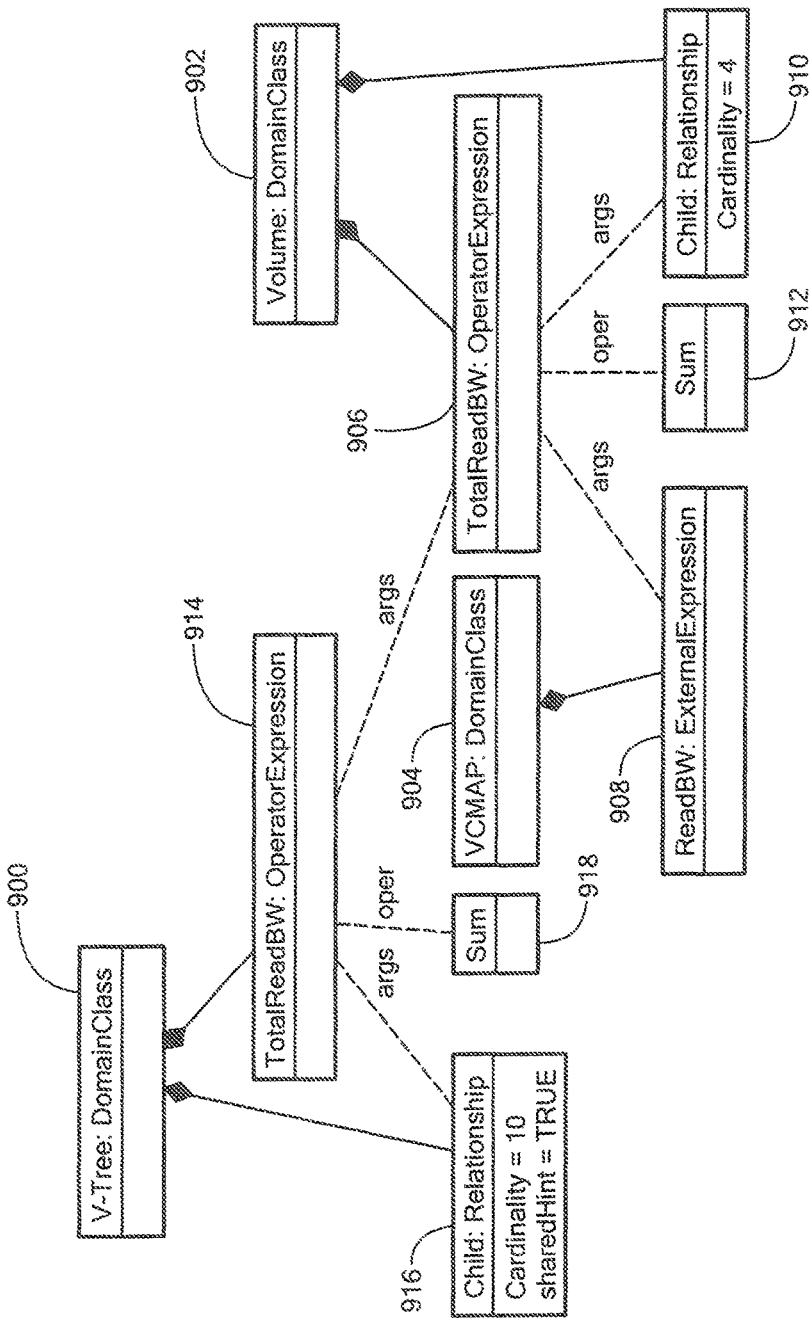
FIG. 9 is a representation of a partial instantiation of a domain model for classes.

FIG. 9 shows a partial instantiation (step 706 FIG. 7) of a portion of the domain model for the class V-tree 900, volume 902, and VCMAP 904 (see FIG. 8). V-tree comprises a compute of TotalRead BW=sum(Child->Volume::ReadBW. TotalReadBW expression 906 is provided arguments from ReadBW: External Expression 908 and arguments from Child Relationship 910 and a sum operator 912. TotalReadBW 914 is provided arguments from Child:Relationship 916, which has cardinality=10 and shared hint TRUE, arguments from TotalBW 906, and a sum operator 918. As shown above, for example:

| |
|---|
| class V-Tree { <br>   computed TotalReadBW = sum(Child->Volume::ReadBW) <br>   shared relationship Child, Volume(10) <br> } <br> class Volume { <br>   computed TotalReadBW = sum(Child->VCMAP::ReadBW) <br>   relationship Child, VCMAP(4) <br> } <br> class VCMAP { <br>   external ReadBW <br> } |

Figure 10:
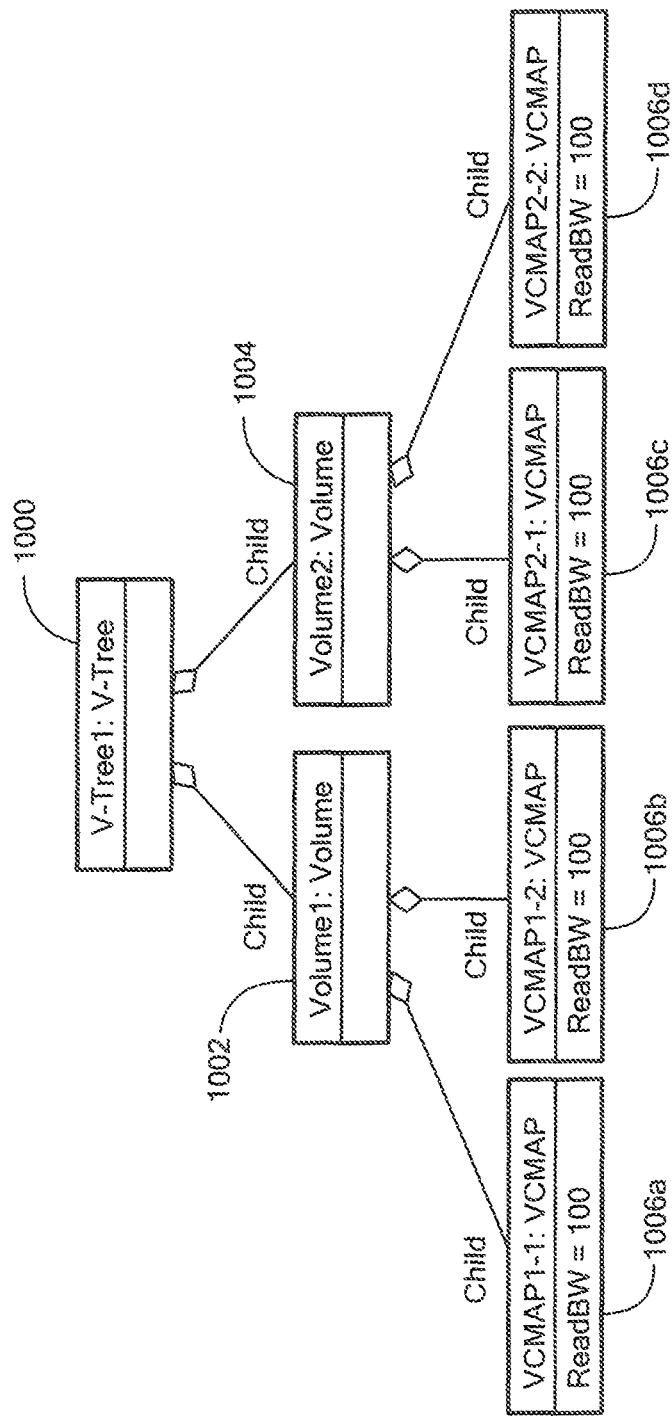
FIG. 10 is a representation of a partial topology that has been loaded.
Figure 10A:
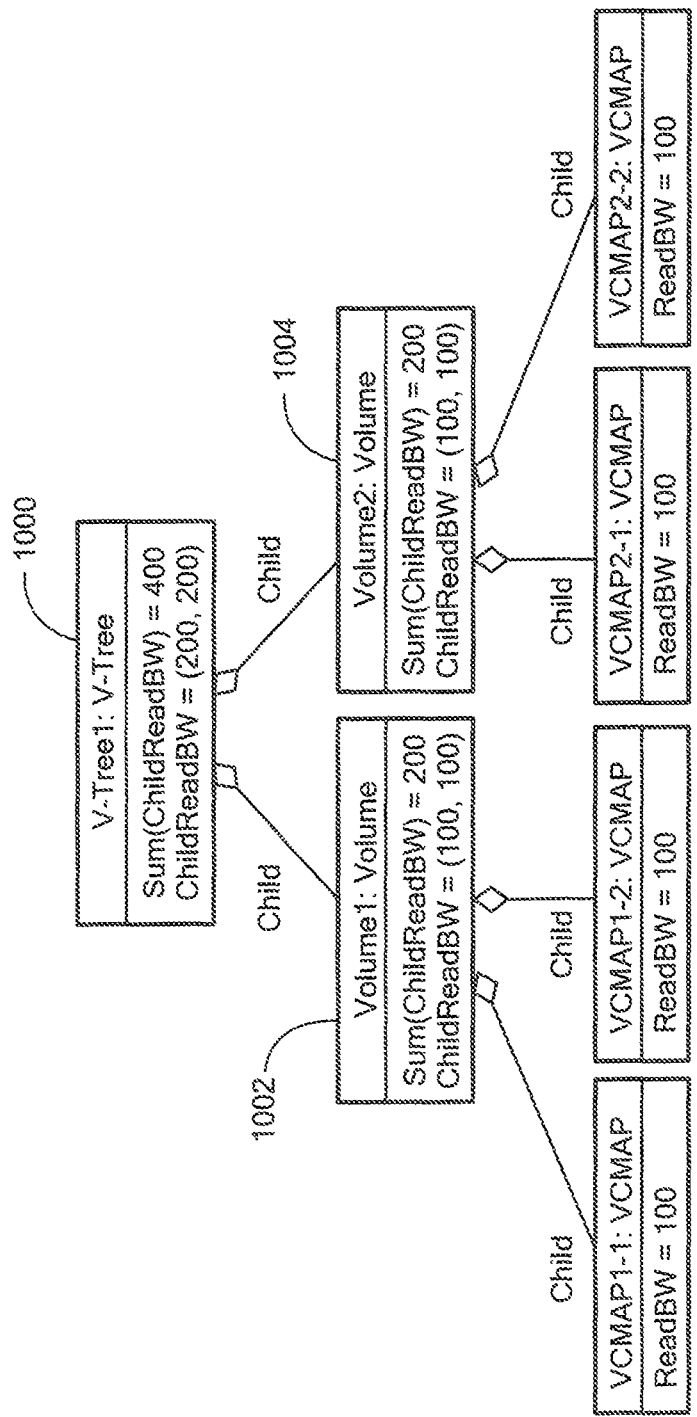
FIG. 10A is a representation of the partial topology of FIG. 10 after message processing to recalculate values of attributes.

FIG. 10 shows a system load of the initial topology (step 708 FIG. 7) comprising an instantiation of the domain objects and relationships as well as the initial values for any external attributes. A volume tree 1000 includes child volumes 1002, 1004, that include respective child VCMAPs 1006a-d, which include initial read bandwidth values shown as 100. FIG. 10A shows the topology after propagation of incoming messages to recalculate computed attributes. As can be seen, the first child volume 1002, which has two child VCMAPs 1006a,b with ReadBW=100, is updated to ChildReadBW (100, 100) and sum(ChildReadBW)=200. Similarly, volume tree 1000 is updated to Sum(ChildReadBW) =400 and ChildReadBW=(200, 200). It is understood this is illustrative to facilitate an understanding of inventive embodiments.

Figure 11A:
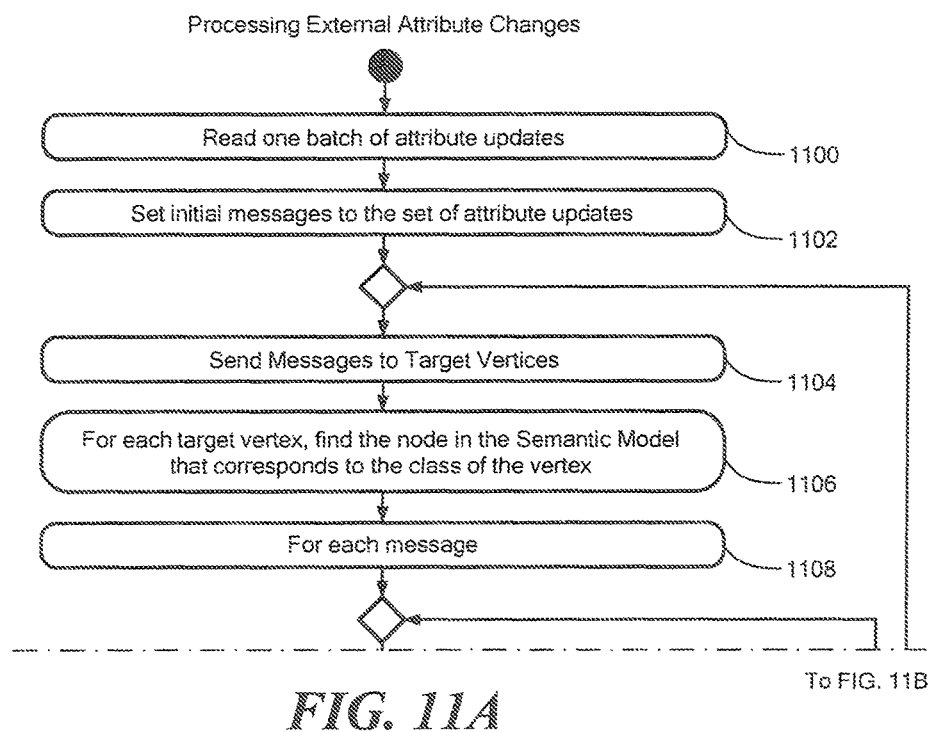
FIGS. 11A, B are a flow diagram for processing external attribute changes.

FIGS. 11A, B show an illustrative processing of messages (step 710 FIG. 7). The system propagates the incoming messages to recalculate the values of computed attributes. In step 1100, a batch of attribute updates is read and in step 1102, the initial messages are set to the set of attribute updates. In step 1104, the messages are sent to target vertices for processing. In step 1106, for each target vertex, a semantic model for the vertex class is found. For each message 1108, a semantic model is found in step 1110 and an update of the expression is performed. Expressions are then found that depend on this expression in step 1112. For each dependent expression 1113, in step 1114, it is determined whether the dependent expression is in the same class. If not, in step 1116 a new output message is generated to target the dependent node. If so, in step 1118, the dependent expression is re-evaluated for the new message. In step 1120, if the dependent expression has changed value, the message is added to the list of messages to be processed for the node. In step 1122, a new external message is generated if the dependent expression is marked for export. In step 1124, it is determined whether there are more dependent expressions to process. If so, processing continues in step 1114. In step 1126, it is determined whether there are more messages for the present vertex. If so, processing continues in step 1110. In step 1128, it is determined whether there are more messages to process. If so, processing continues in step 1104. It can be seen that the processing at each vertex depends only on the state of the vertex and incoming messages. Thus the processing can process in parallel at each node utilizing vertex-centric program.

Figure 12:
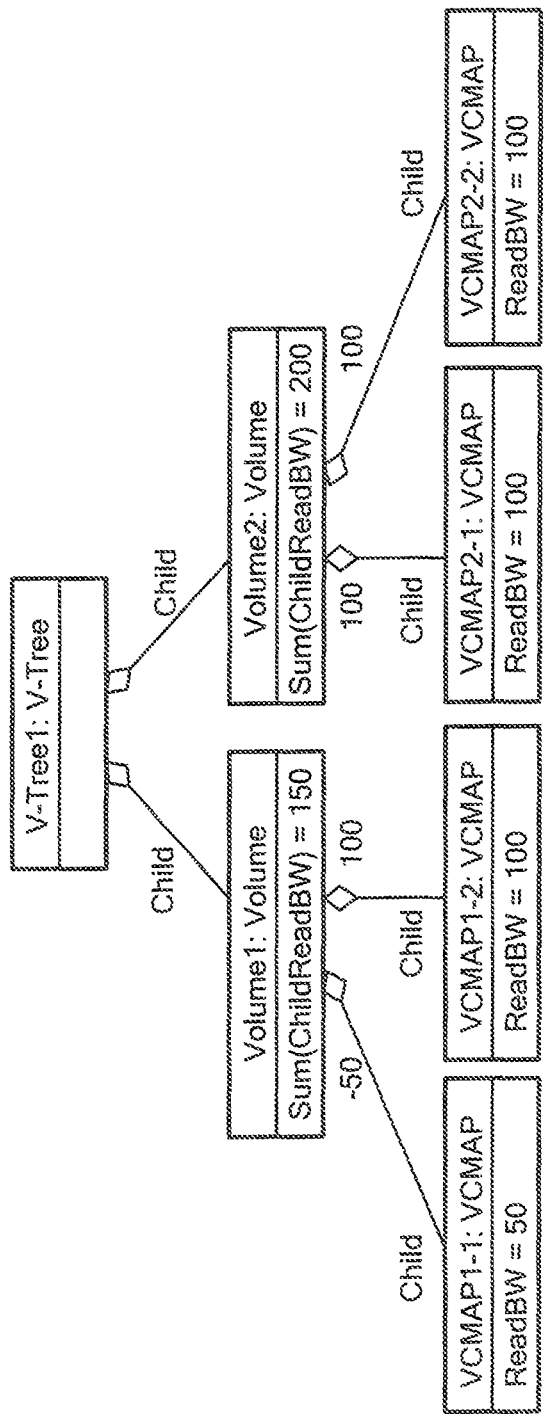
FIG. 12 is a representation of state optimization.

In one embodiment, incoming messages are combined at the target node/vertex in order to provide sufficient data for the reevaluation of each expression. In another embodiment, only the sum is retained while differences in value are sent between the old and new values in order to recalculate the sum as shown in FIG. 12 where the ReadBW for VCMAP1-1 is updated to 50 and the delta message of −50 is propagated to the parent object as shown. This optimization enables provides efficiencies in that the state required for processing updates in each vertex is now proportional to the number of expressions rather than being proportional to the number of related expression instances and the updates can be combined via summing at each node along the way.

Figure 13A:
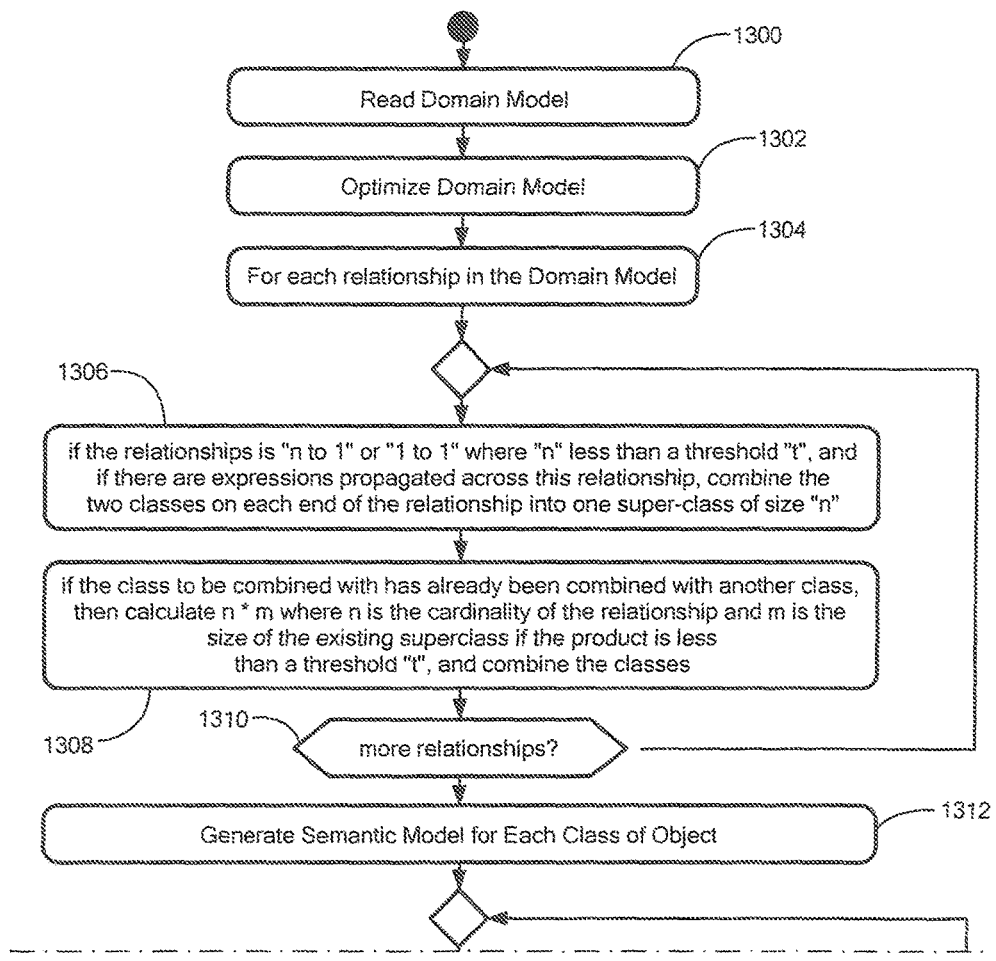
FIGS. 13A, B are a flow diagram for mapping imported topology and expressions for graph-based processing.
Figure 13B:
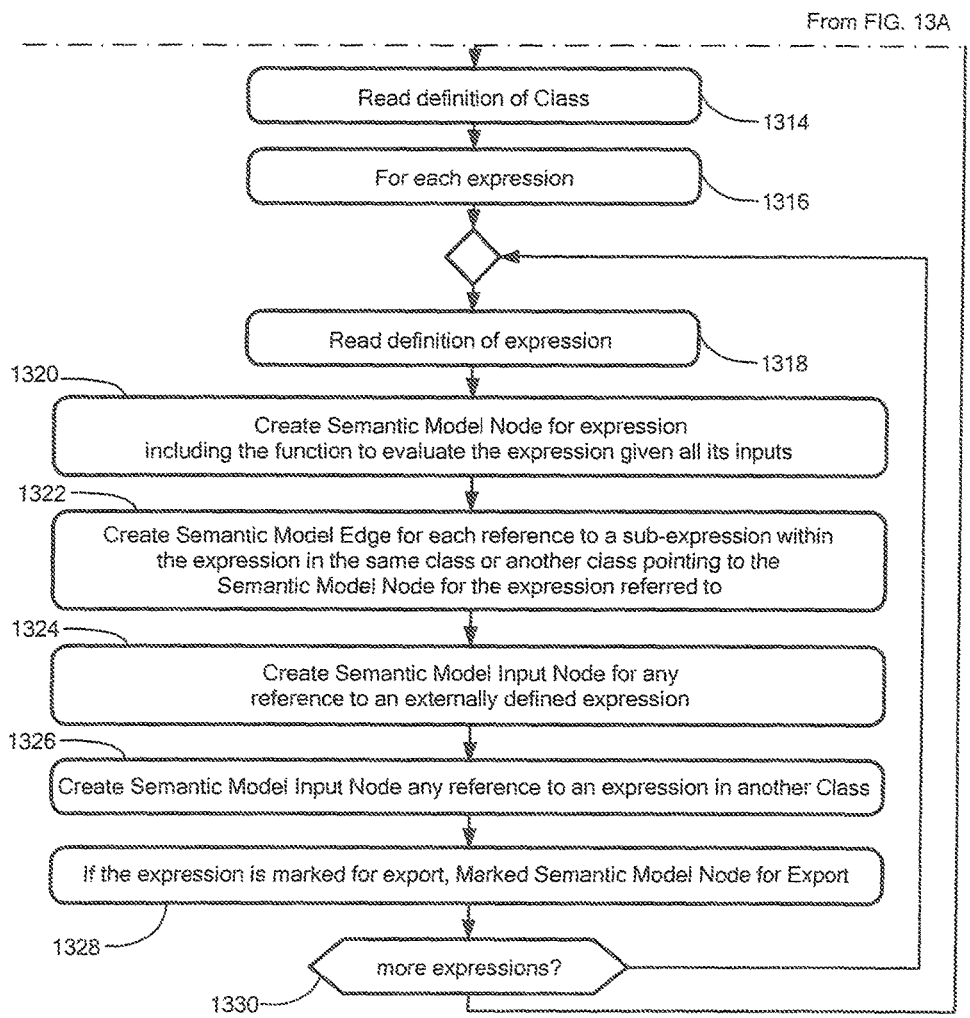

FIGS. 13A, B show an illustrative generation of the semantic model from the domain model in textual form. The semantic model is used by the expression engine to process attribute updates based on the vertex-centric graph processing framework. In general, in graph processing, a graph represents a set of vertices connected by a set of edges. The graph is updated as new information is received.

In step 1300, the system reads a domain model and in step 1302 the domain model is optionally optimized, as discussed above. For each relationship in the domain model 1304, in step 1306 for relationships less than n to 1 in size where there are expressions propagated across the relationship, the classes are combined on each end of the relationship into a super-node of size n. Alternatively, classes are combined into a super-node if the relationship has attribute sharedHint=TRUE. In step 1308, a class can be combined with a class than has already been combined. In one embodiment, (n)(m) is computed wherein n is cardinality of the relationship and m is the size of the existing superclass. If (n)(m) is less than threshold T, the classes are combined.

In step 1310, it is determined whether there are more relationships to process. If so, processing continues in step 1306. If not, in step 1312, a semantic model node is generated for each class of object. In step 1314, the system reads the definition of the class. For each expression 1316, in step 1318, the system reads the definition of the expression. In step 1320, a sematic model node for the expression is created including an evaluation expression for its inputs. In step 1322, a semantic model edge is created for each reference to a sub-expression in the expression in the same or different class pointing to the semantic model node to which the expression refers. In step 1324, a semantic model input node is created for any reference to an externally defined expression. In step 1326, a semantic model input node is created for any reference to an expression in another class. In step 1328, the semantic model node is marked for export if the expression is export marked. In step 1330, it is determined whether there are additional expressions to be processed. If so, processing continues in step 1314.

Figure 14:
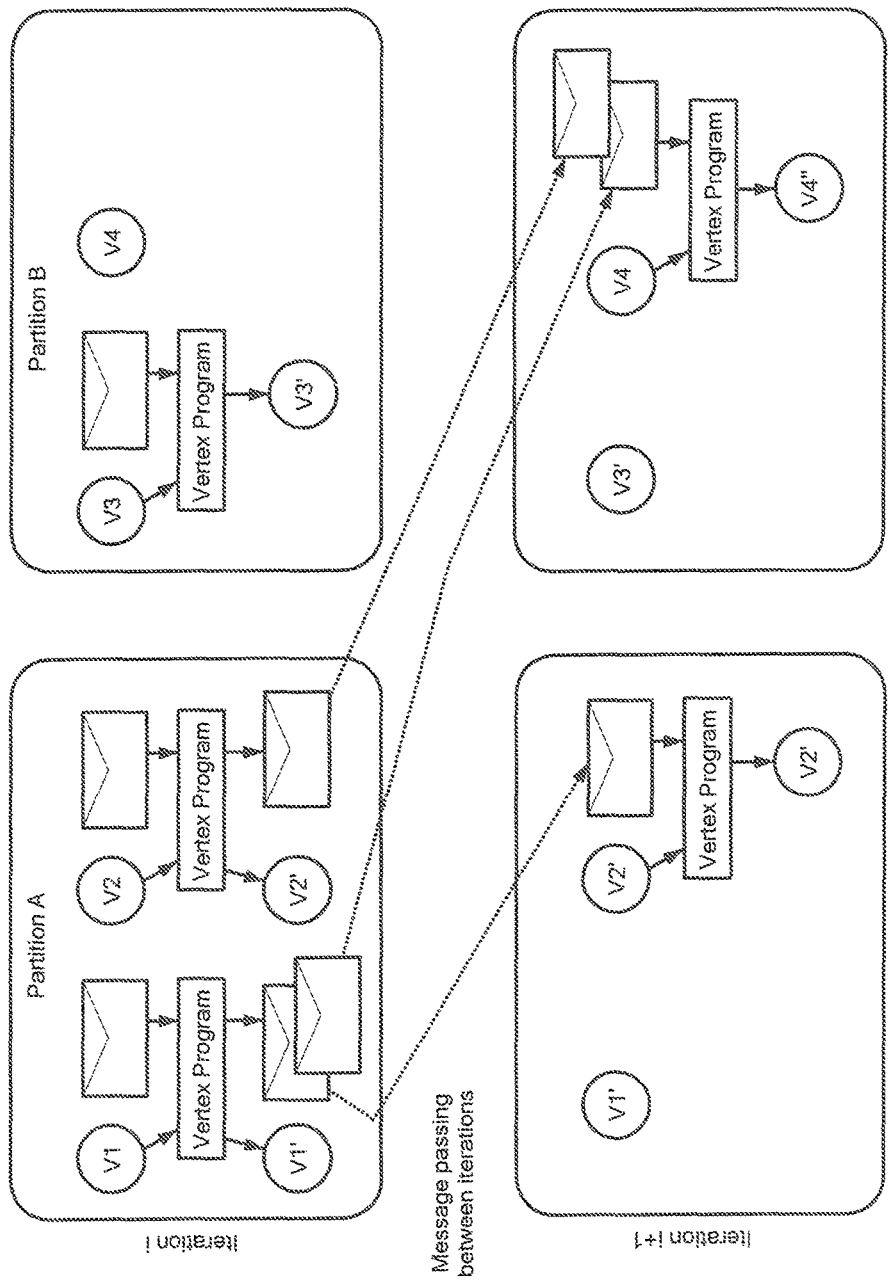
FIG. 14 is a schematic representation of a system with partitions and an iteration of processing after attribute updates.
Figure 15A:
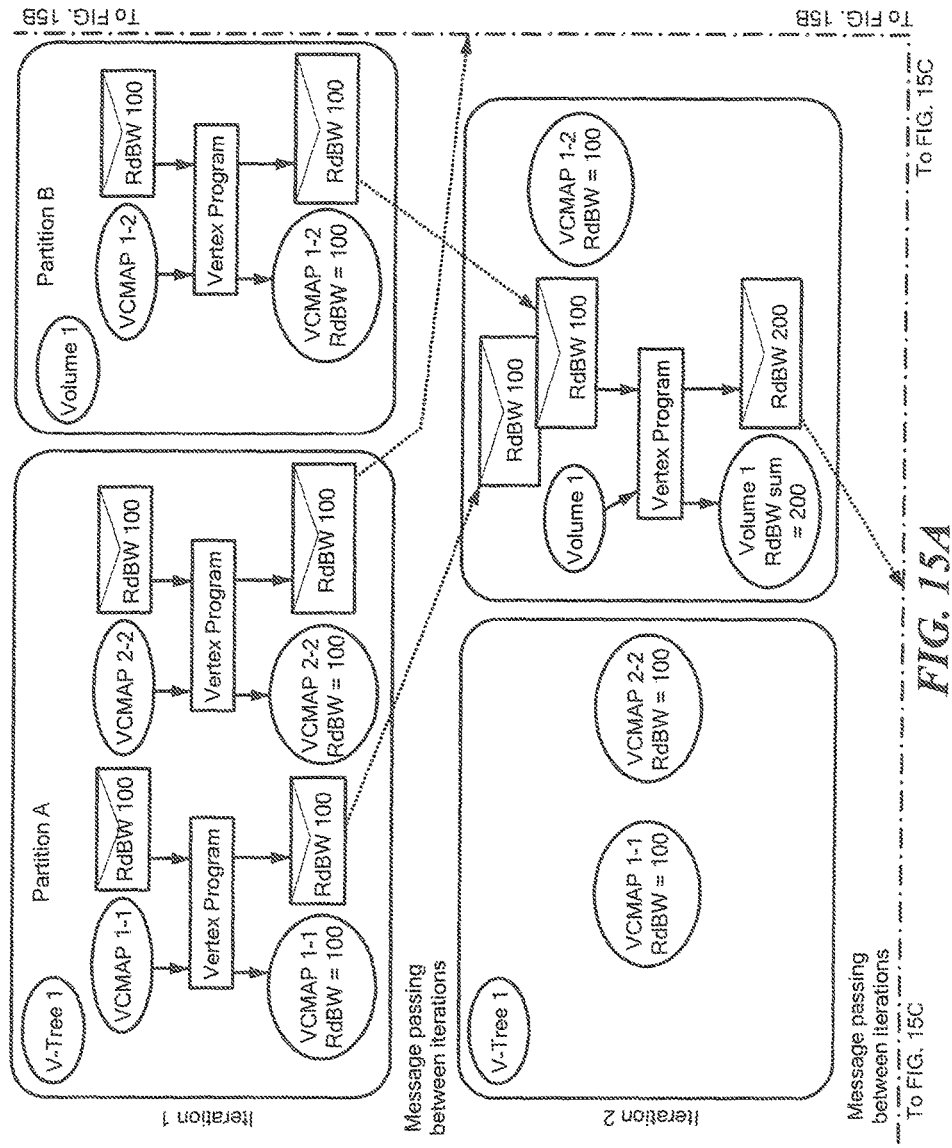
FIGS. 15A-D are a schematic representation of expression updating over iterations.
Figure 15B:
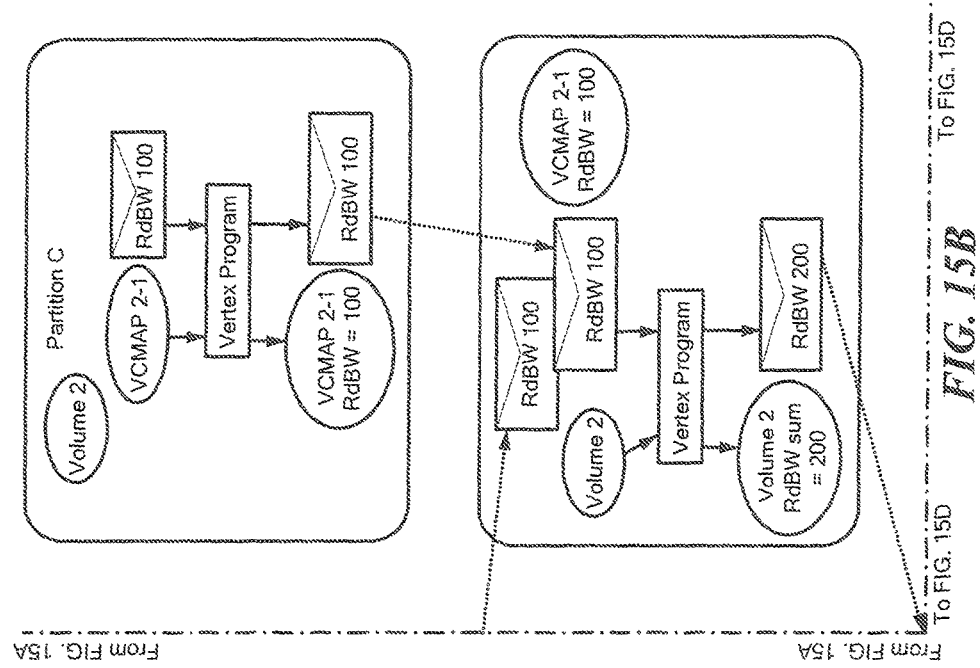
Figure 15C:
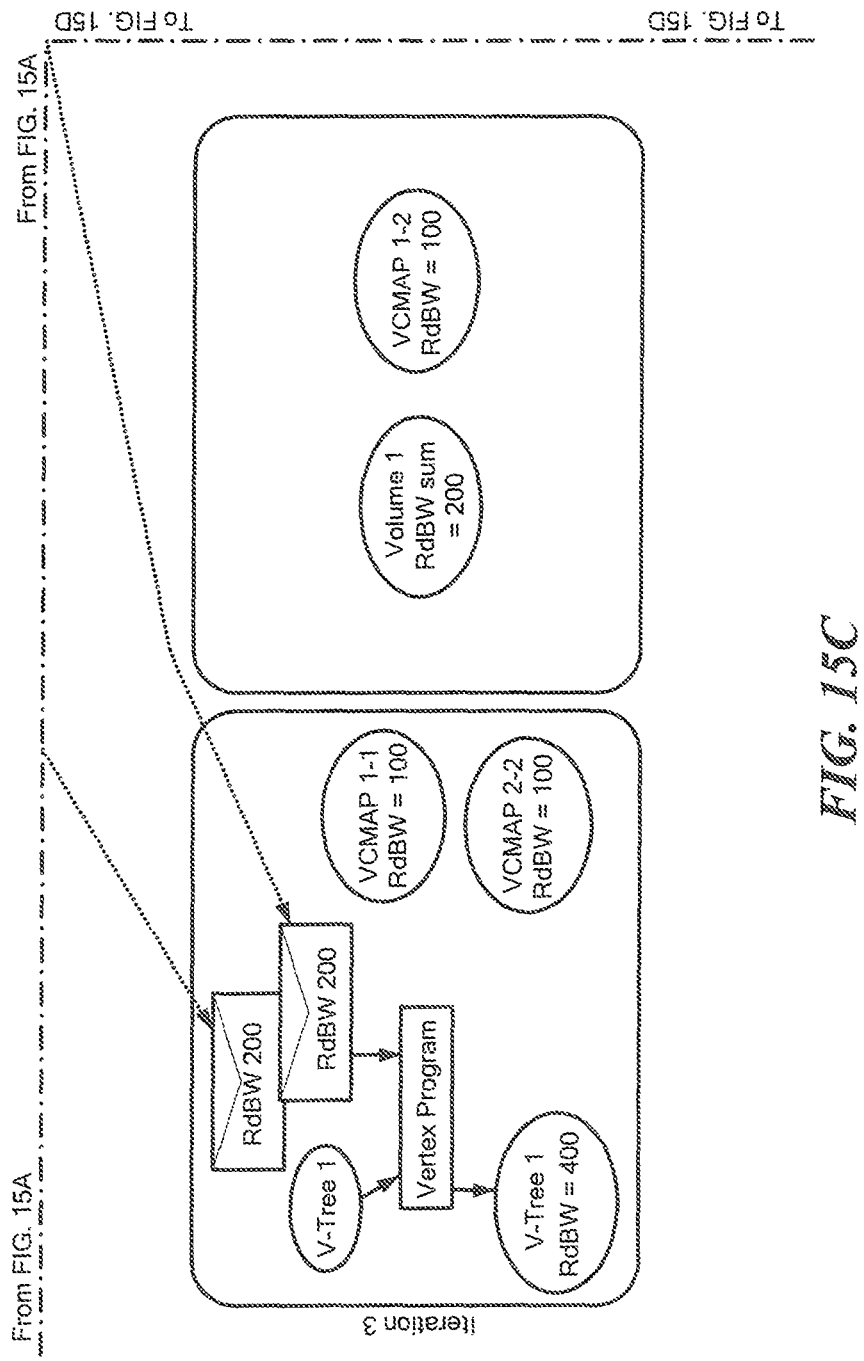
Figure 15D:
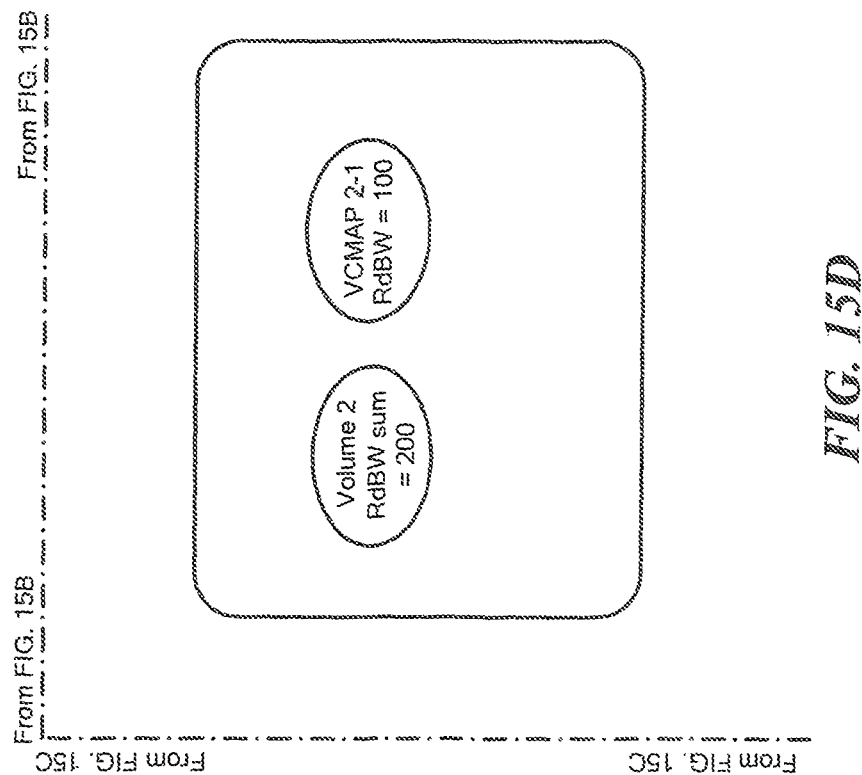

While vertex centric processing is described, it is understood that any suitable graph-based processing can be utilized. In general, vertex-centric processing runs iteratively on graphs in a distributed manner. FIG. 14 shows illustrative elements of the vertex-centric processing model in two iterations i, i+1 of processing on four vertices V1, V2, V3, V4 distributed over a two-partition A, B cluster. It is understood that vertices and partitions can reside on the various components described above in conjunction with elastic converged storage in a datacenter environment, for example.

At each iteration, the state of the vertices V1-4 that receive messages (shown with envelope symbol) are recomputed at each of those vertices. For example, at iteration i, vertices V1, V2 and V3 receive messages and a vertex module runs to recompute the state of the vertices to V1', V2' and V3', respectively, for iteration i+1. Vertex V4 does not receive any messages, and its state remains the same. For the expression engine, the state of a vertex is represented by a set of expressions and their values, as described above.

Since vertices V1-4 are partitioned with data distributed in a cluster of nodes, the vertex module at each vertex can be run simultaneously and independently to take advantage of multiple processors in compute nodes, which renders processing inherently scalable.

Once the vertex modules complete an iteration, the state change of each vertex is then sent via messages to any neighboring vertex. In this example, vertex V1 has messages for vertices V2 and V4, while V4 also receives messages from V2. A neighbor vertex can be in a different compute node, in which case the message is sent across the network.

For the expression engine, state change is a set of expression changes. Not all expressions are required to propagate their changes to neighbors, only those that have a depending expression at a neighbor vertex. In the figure, vertex V3 has state change but the state change does not require any outgoing message. Since vertex V4 receives multiple messages, those messages could be combined before being delivered to the vertex module.

The same process repeats in the next iteration. For example, at iteration i+1, only vertex V2 and vertex V4 receive messages and run the vertex module. No outgoing messages are generated. At this point, the entire vertex-centric processing terminates. The processing can also be terminated when a pre-defined number of iterations is reached.

FIGS. 15A-D show an illustrative expression engine implemented in a vertex-centric processing model including send updates (step 712, FIG. 7) and message processing (step 710, FIG. 7). In this illustration, 7 objects are placed into 3 partitions. The first object from the top, V-Tree 1, is placed into partition A; the second and third objects, volume 1 and volume 2, are placed to partition B and partition C, respectively. Then we go back to partition A and place the 4th object, VCMAP 1-1, and so on.

At the first iteration, the 4 VCMAPs receive an update of ReadBW and run the vertex module, which generates messages for the respective volume. VCMAPs 1-1 and 1-2 generate a message each for Volume 1, while VCMAPs 2-1 and 2-2 generate one each for Volume 2.

At iteration 2, both volumes receive the updates from the corresponding VCMAPs. Each runs the vertex module that aggregates the ReadBW sum to 200. It also generates a message to carry this data for V-Tree 1.

At iteration 3, V-Tree 1 receives the two messages from the volumes and runs the vertex module that aggregates the ReadBW sum to 400.

Figure 11B:
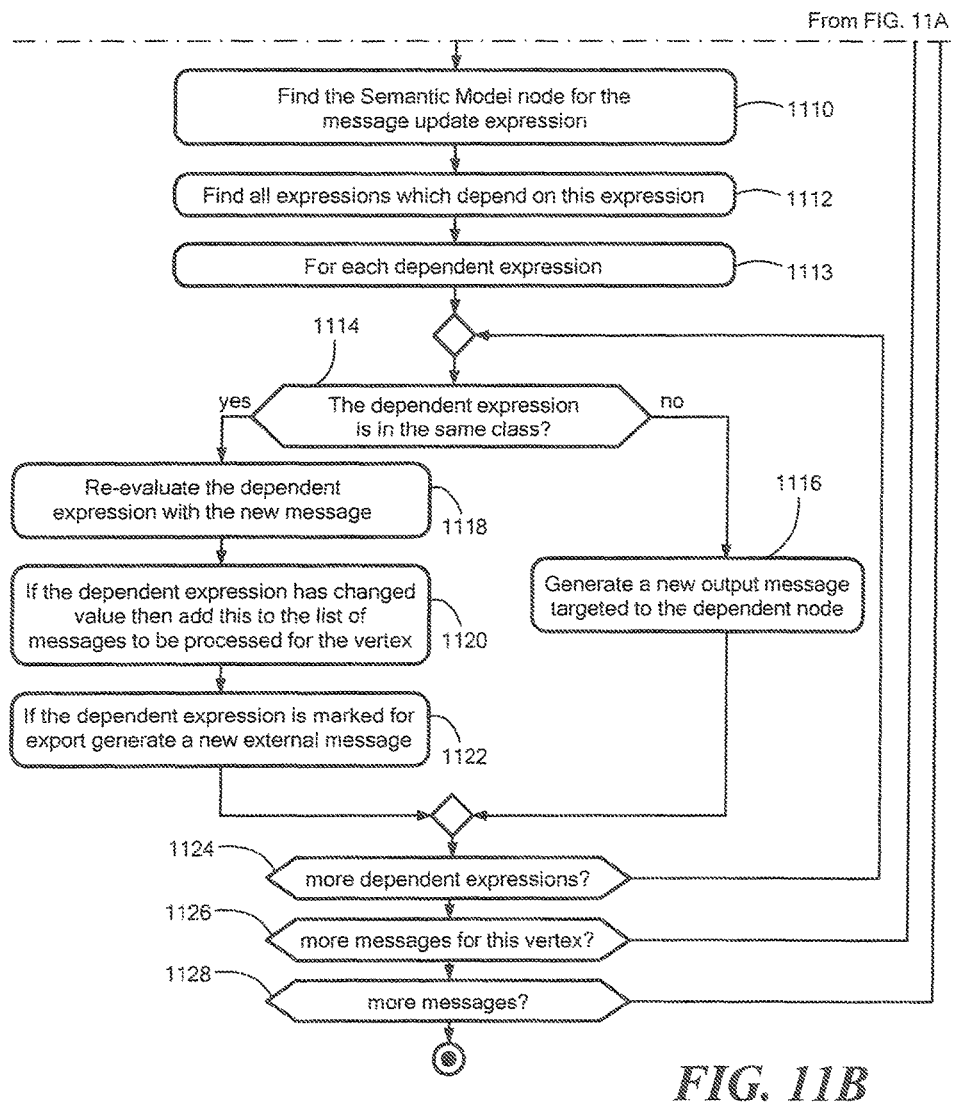
Figure 16:
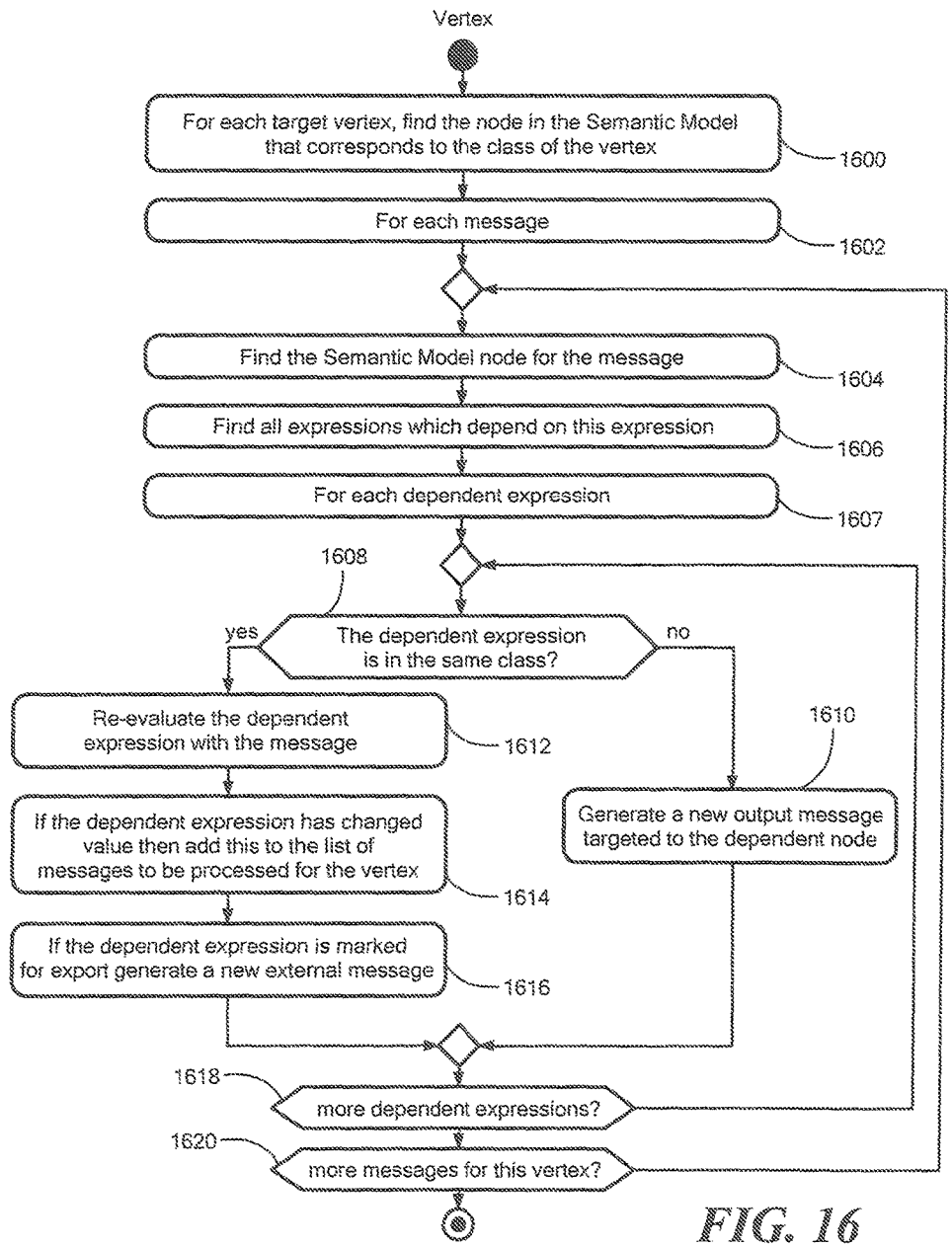
FIG. 16 is a flow diagram showing processing of external attribute changes.

FIG. 16 shows illustrative workflow for implementing vertex module program for an expression engine which is part of the processing external attribute changes described in FIG. 11. In step 1600, the node in the semantic model that corresponds to the class of vertex is identified. For each message 1602, the semantic model node for the message is found in step 1604 and in step 1606 expressions dependent upon the present expression are found. For each dependent expression 1607, in step 1608, it is determined whether the dependent expression is in the same class as the present expression. In not, in step 1610, a new output message is created targeted to the dependent node/vertex. If so, in step 1612, the dependent expression is re-evaluated with the new message. If the dependent expression has changed value, then the message is added to the list of messages to be processed for the present vertex in step 1614. In step 1616, if the dependent expression is marked for export, a new external message is generated. In step 1618, it is determined whether there are more dependent expressions for processing and in step 1620, it is determined whether there are more messages for the present vertex.

Figure 17:
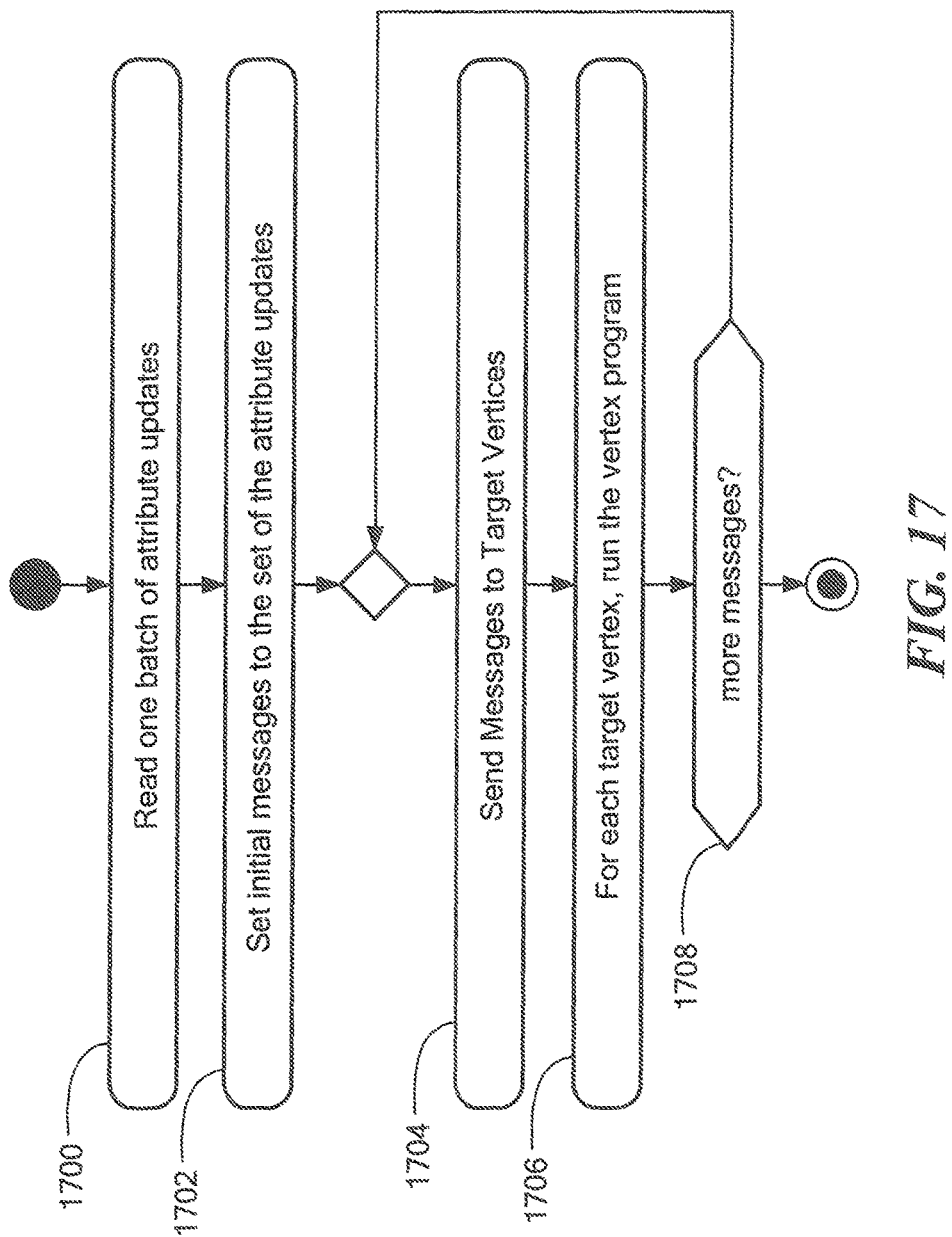
FIG. 17 is a flow diagram showing processing of vertex processing.

FIG. 17 shows an illustrative workflow of processing external attribute changes that calls the vertex module. In step 1700, a batch of attribute updates is read and the system sets initial messages to the set of attribute updates in step 1702. In step 1704, messages are sent to target vertices and in step 1706, the target vertices run the vertex module. In step 1708, it is determined whether there are more messages for processing.

Figure 18:
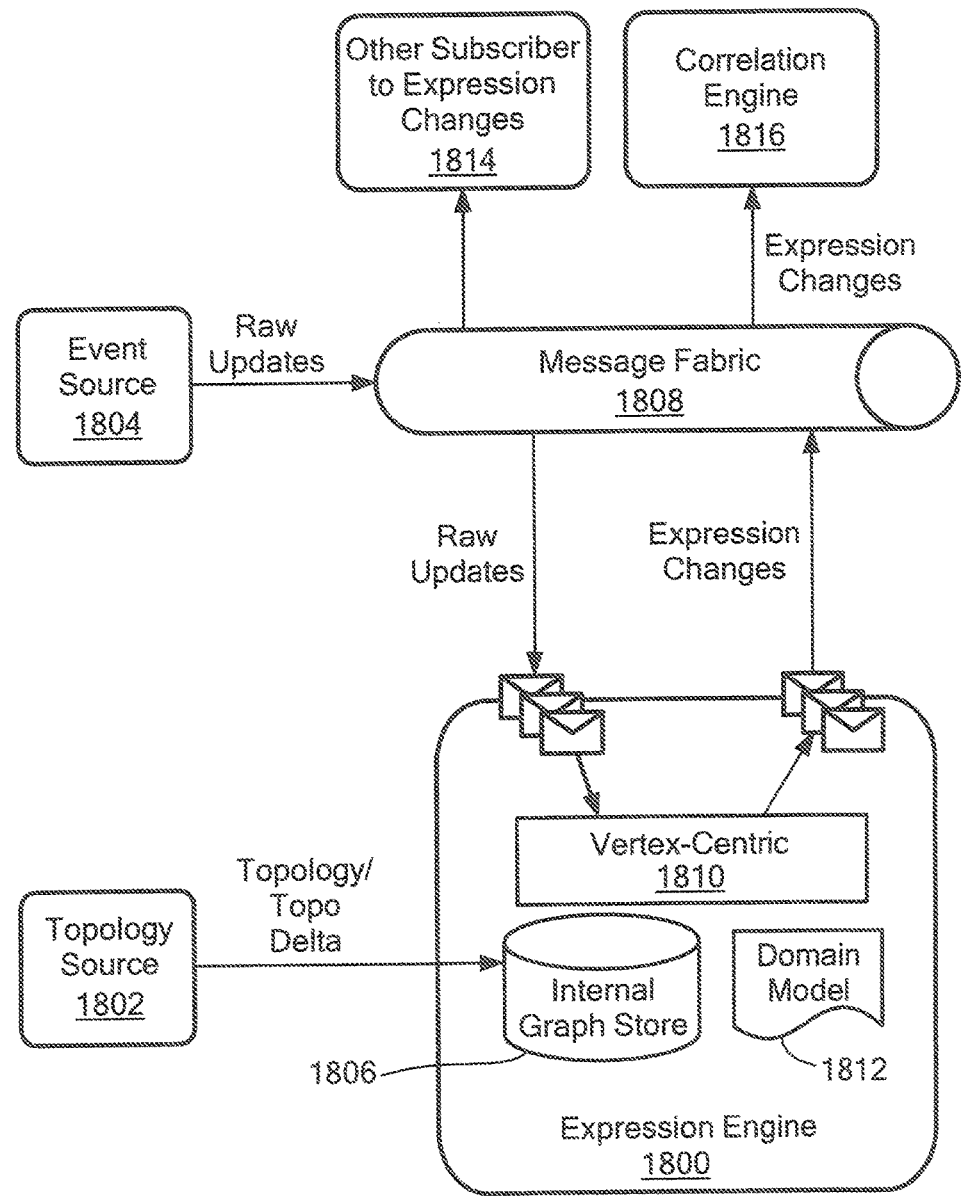
FIG. 18 is a schematic representation of external system interaction.

FIG. 18 shows illustrative interaction of an expression engine 1800 interacting with external systems. A topology source 1802 and an event source 1804 are coupled to the expression engine 1800. From the topology source 1802, the expression engine 1800 imports relevant topology and caches it in its own graph store 1806. The topology can be either refreshed periodically or updated incrementally via topology change messages. The internal graph store also keeps the states of the expressions for each vertex.

From the event source 1804, the expression engine 1800 receives updates of external attributes. The receiving of the updates can be through a message fabric 1808, for example. The update messages can be batched before being fed into the vertex-centric modules 1810 in the expression engine. The vertex-centric modules propagate the updates to dependent expressions in any vertices. The propagation and associated computation are driven by the definitions in the domain model 1812.

Once the computation of dependent expressions is done, the expression engine delivers the net expression changes for external systems 1814 to subscribe to. One such external system could be the codebook correlation engine 1816 that takes the expression changes as input and computes the most likely causes.

In another aspect of the invention, closure computations are performed using graph processing. Operational management of a data center, for example, requires continuous updating of the current set of failures, and impacts of those failures, in the datacenter in the face of constant change. In embodiments, the system calculates current states having expressions that process various types of input. A first set of inputs includes topological data representing the managed objects in the datacenter. The first set of inputs can be represented by a constantly changing graph. A second set of inputs includes a stream of telemetry data coming from the managed objects in the datacenter. The expressions to compute the current state are continuously evaluated against the changing graph and telemetry stream in near-real time. The output of these expressions can be then fed to a reasoning engine which can determine the most likely set of faults explaining the observed data. The reasoning engine may require computing a closure of the fault propagation model over failure modes. In addition, the impact of a given failure may be determined as a closure on the impact propagation model for that failure/problem. This computation should scale to total of the sizes of the datacenters under management. In illustrative embodiments, vertex centric processing is used for decomposing graph processing problems so that they can be scaled to very large compute clusters.

In embodiments, an impact engine can be embedded inside an expression engine described above, and/or provided as a separate element. The impact engine responds to queries for a set of impacted expressions by a given problem.

Figure 18A:
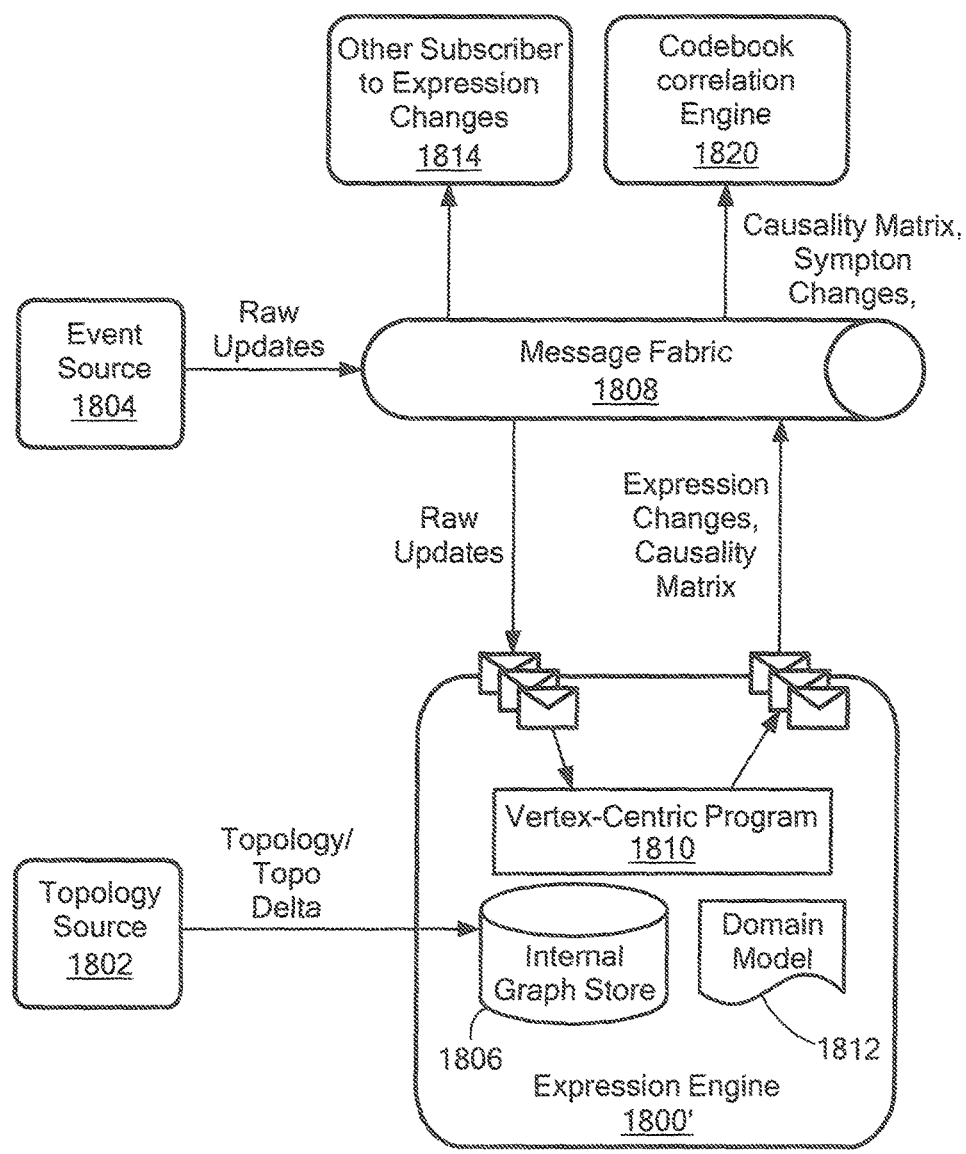
FIG. 18A is a schematic representation of external system interaction including causality matrix generation.

In one aspect of the invention, an expression engine determines, for each problem of managed objects in a topology graph, a set of symptoms associated with that problem based on causality relationships between problems and symptoms defined in the domain model. FIG. 18A shows an expression engine 1800' and components having some commonality with the expression engine of FIG. 18 with the addition of a causality matrix generated by the expression engine and sent to codebook correlation engine 1820 via the message fabric 1808. A symptom refers to a Boolean expression with additional properties called loss probability and spurious probability, which are described below, caused by a problem as described in the domain model. The calculated problem closure, sometimes also referred as the causality matrix, is used by the codebook correlation engine 1830, which is described below, along with a set of active symptoms, to produce a set of problems that best explain the set of active symptoms.

Figure 19:
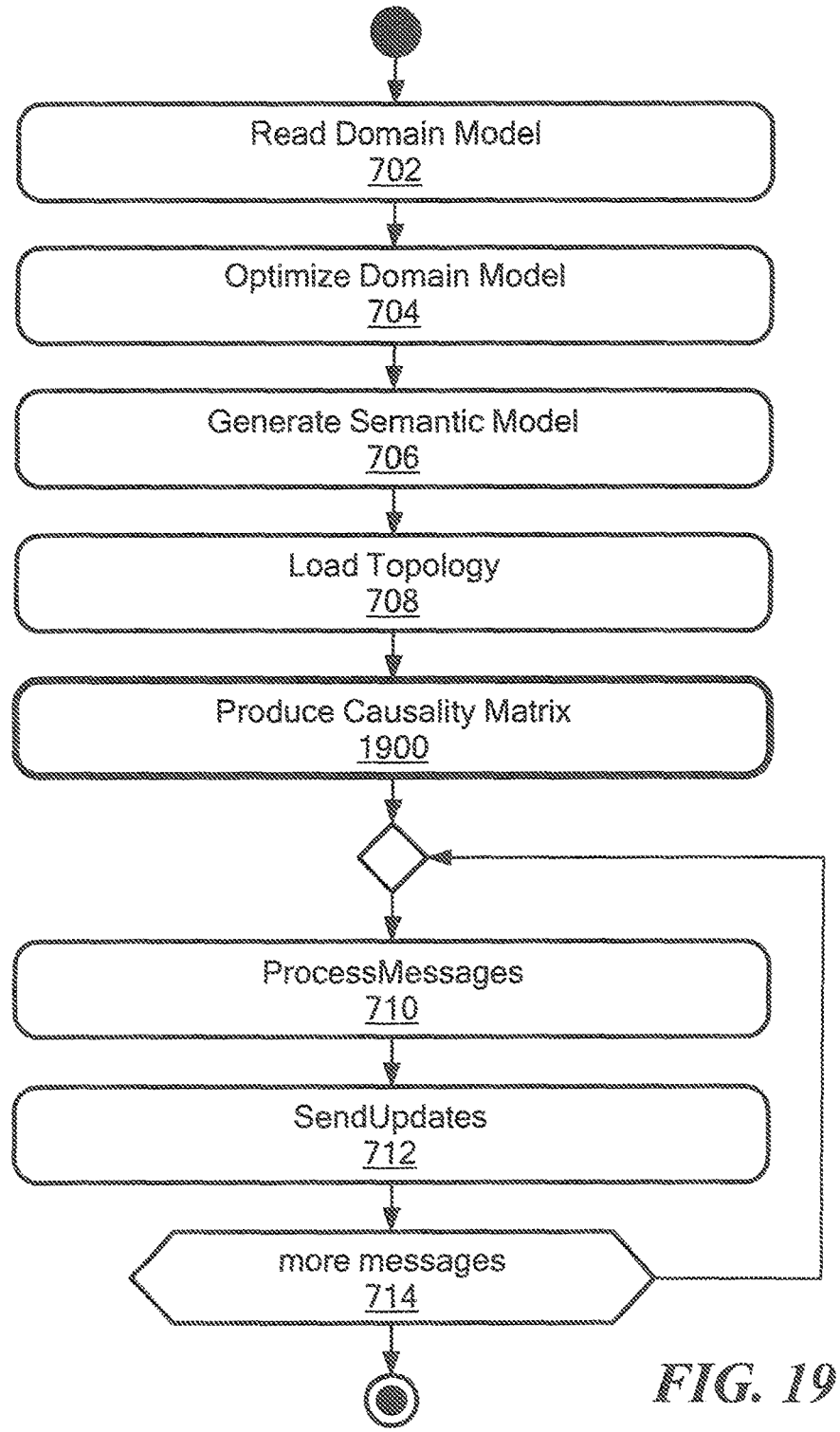
FIG. 19 is a flow diagram showing high level expression engine processing.

FIG. 19 shows a high level process flow for the expression engine after incorporating step 1900 to the process of FIG. 7 to produce the causality matrix. As described above, the expression engine 1800' generates the causality matrix and sends it to the codebook correlation engine 1820.

An illustrative partial domain model of a data storage system in textual form is set forth below with an illustrative problem and symptom definition.

```
...
class SDS {
   AvgDevReadBW = avg(Child->StorageDevice::ReadBW)
   relationship Child, StorageDevice (32)
   problem Down(prior: 0.0001) = Child->StorageDevice::
   UnavailableSymptom(causal:
0.9) // problem Down of an SDS causes its child StorageDevice
becoming unavailable
}
class StorageDevice {
   external ReadBW
   external IsUnavailable
   symptom UnavailableSymptom = IsUnavailable {
      loss =0.1
      spurious =0.05
   }
}
...
```

The symptom keyword defines a SymptomExpression (for each StorageDevice). A symptom expression, which represents an element in the closure of a problem, captures an instance of a boolean expression and two properties that describe the symptom, namely the loss and the spurious probabilities. The loss probability indicates how likely a symptom is lost and is not received by the management system (then eventually by the expression engine). The spurious probability indicates how likely a symptom received by the management system is not actually observed in reality. These probability properties are required by the codebook correlation engine, which is described below, to more accurately deduce the causes of the observed symptoms.

The problem keyword defines a ProblemExpression (for each SDS). It is composed of a single prior probability (e.g. "0.0001" in the above example), and a list of causes statements each associated with a causal probability (e.g. "0.9" in the above example). In the above example, there is only one causes statement but there can be multiple. A causes statement defines the relationship between a problem and a set of symptoms. The prior probability indicates how likely the problem occurs without considering any observed symptom. The causal probability defines how likely the associated symptom is observed given the occurrence of the problem. Similarly, these two properties are required for the codebook correlation engine and thus are part of the problem closure sent to the codebook engine. These expression types and their relationships with the existing expression constructs are described below.

Figure 20:
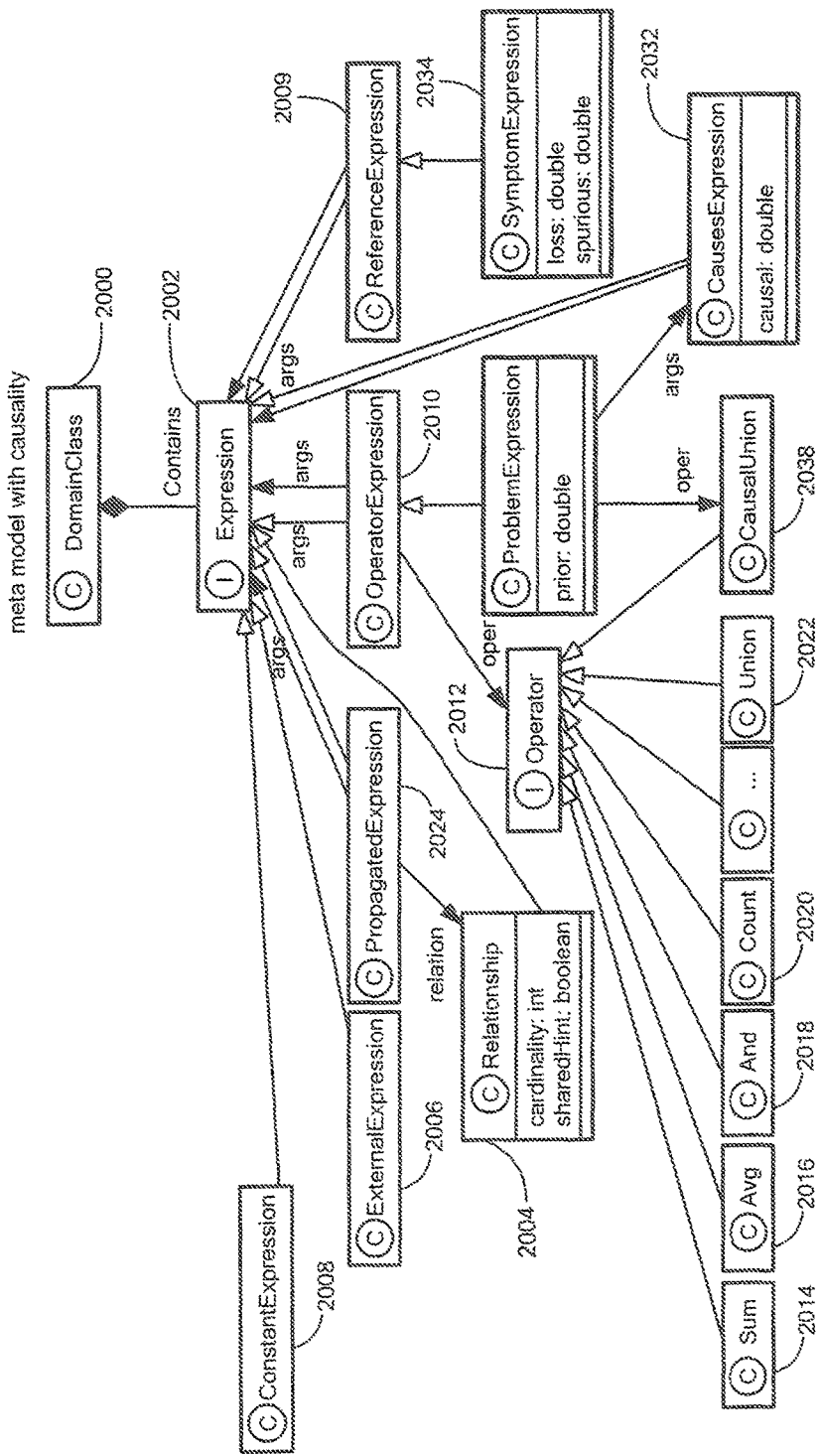
FIG. 20 is a representation of a meta model with causality.

FIG. 20 shows an illustrative meta model with causality elements, which is an extension to the meta model in FIG. 8A, which includes domain class 2000 comprising zero or more expressions 2002 which can be one of either a relationship 2004, which can include a cardinality and a Boolean hint, an external expression 2006; a constant expression 2008; a reference expression 2009; and an operator expression 2010 having operators 2012, such as sum 2014, average 2016 logical AND 2018, count 2020, and union 2022. A reference expression 2009 refers to another defined expression, and when evaluated, it returns a representation of the referred expression and the enclosing object. The meta model also includes a propagate expression 2024 coupled to the relationship 2004. The meta model domain class 2000 can further include one or more of each of the following: a problem expression 2030, a causes expression 2032, a symptom expression 2034. The problem expression 2030 and the symptom expression 2034 are described above. The causes expression 2032 represents a causes statement, and it is associated with the causal probability and the causal union operator 2022 to union related symptoms, which is described by example in FIG. 22. It can happen that the same symptom appears twice in the list during the union operation, in which case the one with bigger causal probability is selected. Alternatively, the two probabilities p1 and p2 can be combined with the formula 1−(1− p1)(1−p2).

Figure 21:
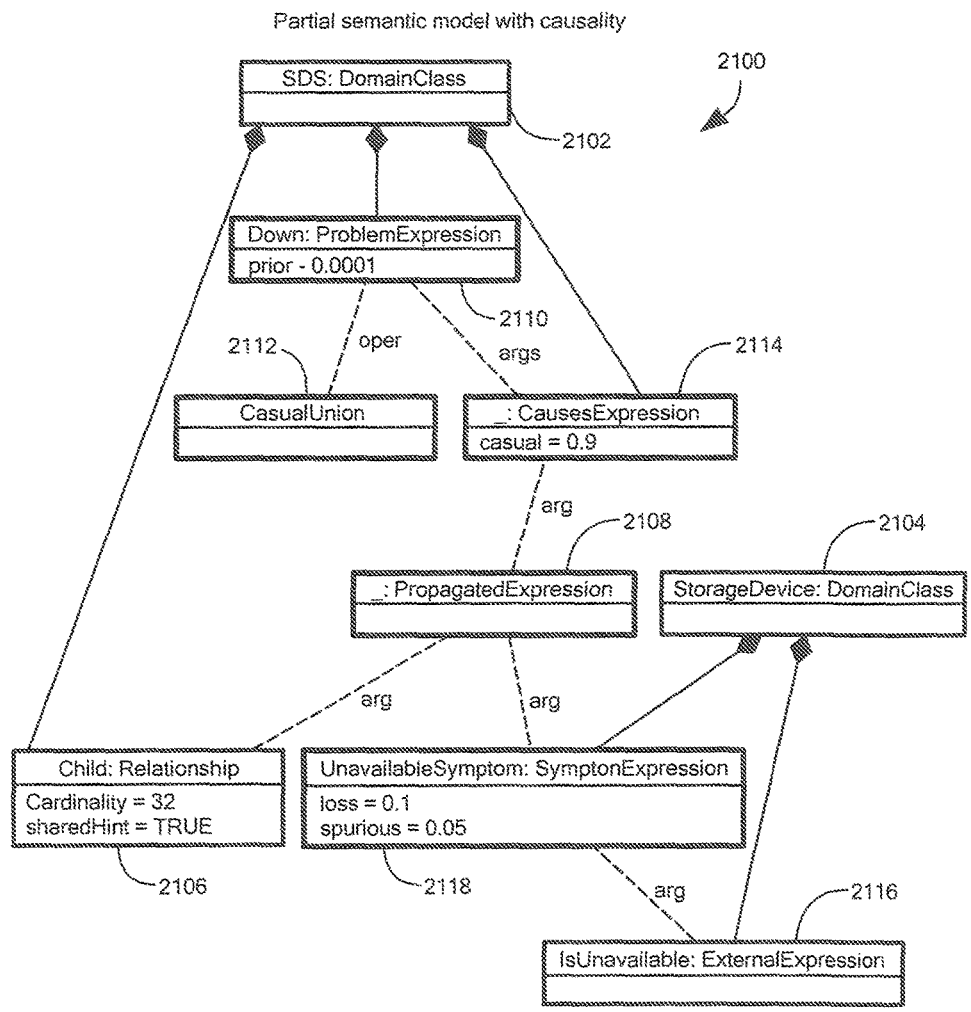
FIG. 21 is a representation of a partial semantic model with causality.

FIG. 21 shows an instantiation of a portion of the elastic converged storage system domain model with the illustrative problem and symptom that can be referred to as a partial semantic model 2100 with causality. Note that the non-causality related elements have been omitted from the figure to best illustrate the relationship among the causality related elements. The symbol "_" appearing in some instantiated expressions indicates that the expression does not exist in the textual model. They are instantiated to facilitate the problem closure calculation using the same expression evaluation framework.

The partial semantic model includes a SDS class 2102 and a storage device class 2104. The SDS class 2102 has a child relationship 2106, which provides arguments to a propagated expression 2108. The SDS class 2102 is coupled to a down 2110 problem expression, which receives a causal union 2112 operator, and to a causes 2114 expression. An IsUnvailable 2116 external expression provides arguments to an UnavailableSymptom 2118 symptom expression, which provides arguments to the causes 2114 expression. The storage device class 2104 is coupled to the IsUnavailable 2116 external expression and to the UnavailableSymptom 2118 symptom expression.

In embodiments, processing is distributed using vertex centric processing. Calculating the problem closure is embedded in the distributed processing for expression propagation described above in the expression engine. When the expression propagation is started, symptom expressions are evaluated and their values are stored at their respective vertices after which these values are propagated to their parent expressions in a manner similar to other expressions. When this propagation terminates at each problem, it will have calculated a list of symptom expressions for the problem.

Figure 22A:
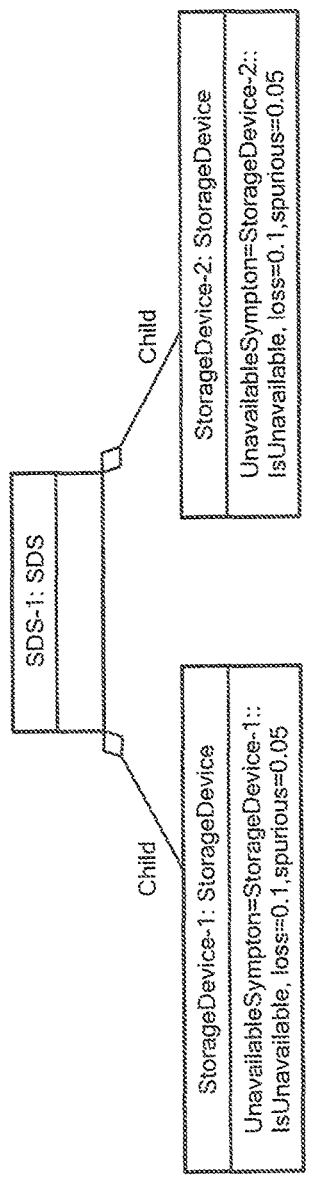
FIGS. 22A, B are a representation of problem and symptom expressions before and after message propagation.
Figure 22B:
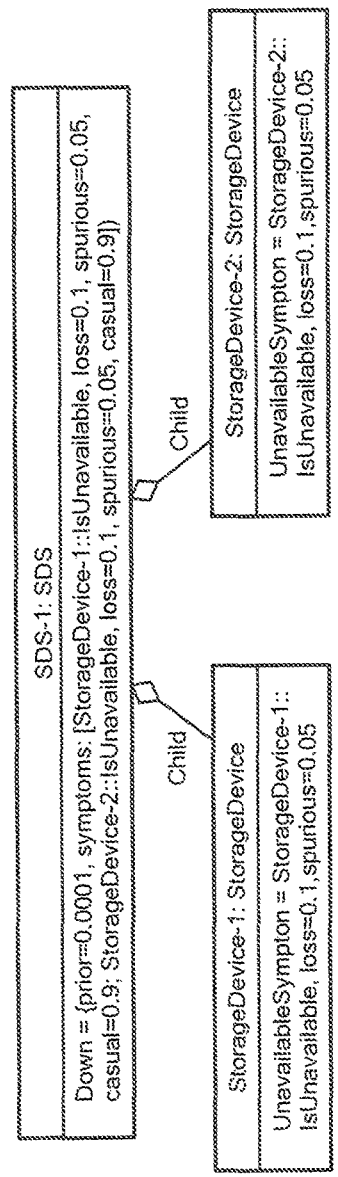

FIGS. 22A, B show illustrative problem and symptom expressions before and after expression propagation. An SDS class 2200 includes first and second child storage devices 2202, 2204 having respective unavailable symptom expressions, as shown. Probabilities are shown as loss=0.1 and spurious=0.05. After expression propagation, as shown in FIG. 22B, the SDS is updated to reflect that storage device 1 and storage device 2 are down with a prior probability of 0.0001 and a computed causal probability of 0.9, as shown.

Figure 23:
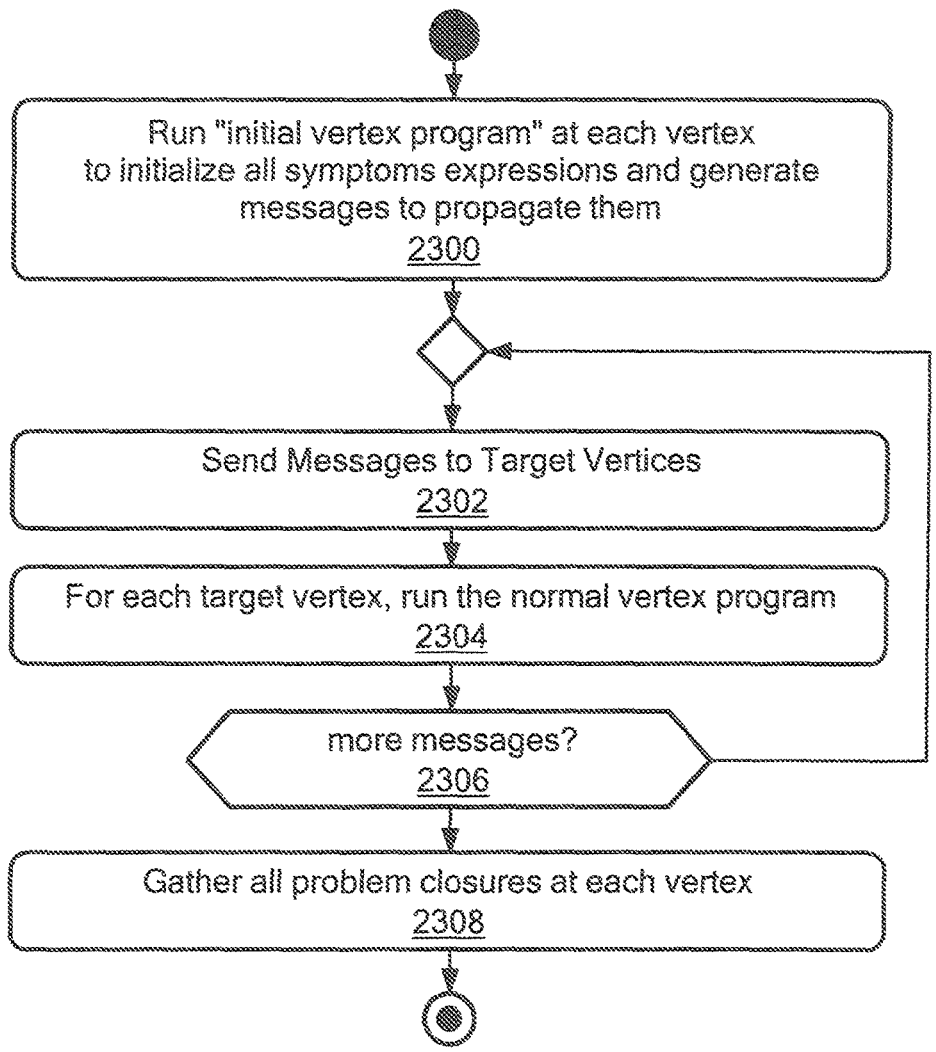
FIG. 23 is a flow diagram showing causality matrix generation.

FIG. 23 shows illustrative processing for generating a causality matrix which has common processing with FIG. 17. In step 2300, the vertex module is run at each vertex to initialize all symptom expressions and generate propagation messages to target vertices in the next round.

This propagation process continues until no more messages are produced at some round. This also means that each problem will also have its closure (e.g., a list of symptoms) computed. Steps 2302, 2304, and 2306 are substantially similar to the corresponding steps in FIG. 17. In step 2308, once the propagation is completed, the problem closures can be gathered from the graph and be sent out to the message fabric where the codebook correlation engine (1820, FIG. 18A) can consume them.

Figure 24:
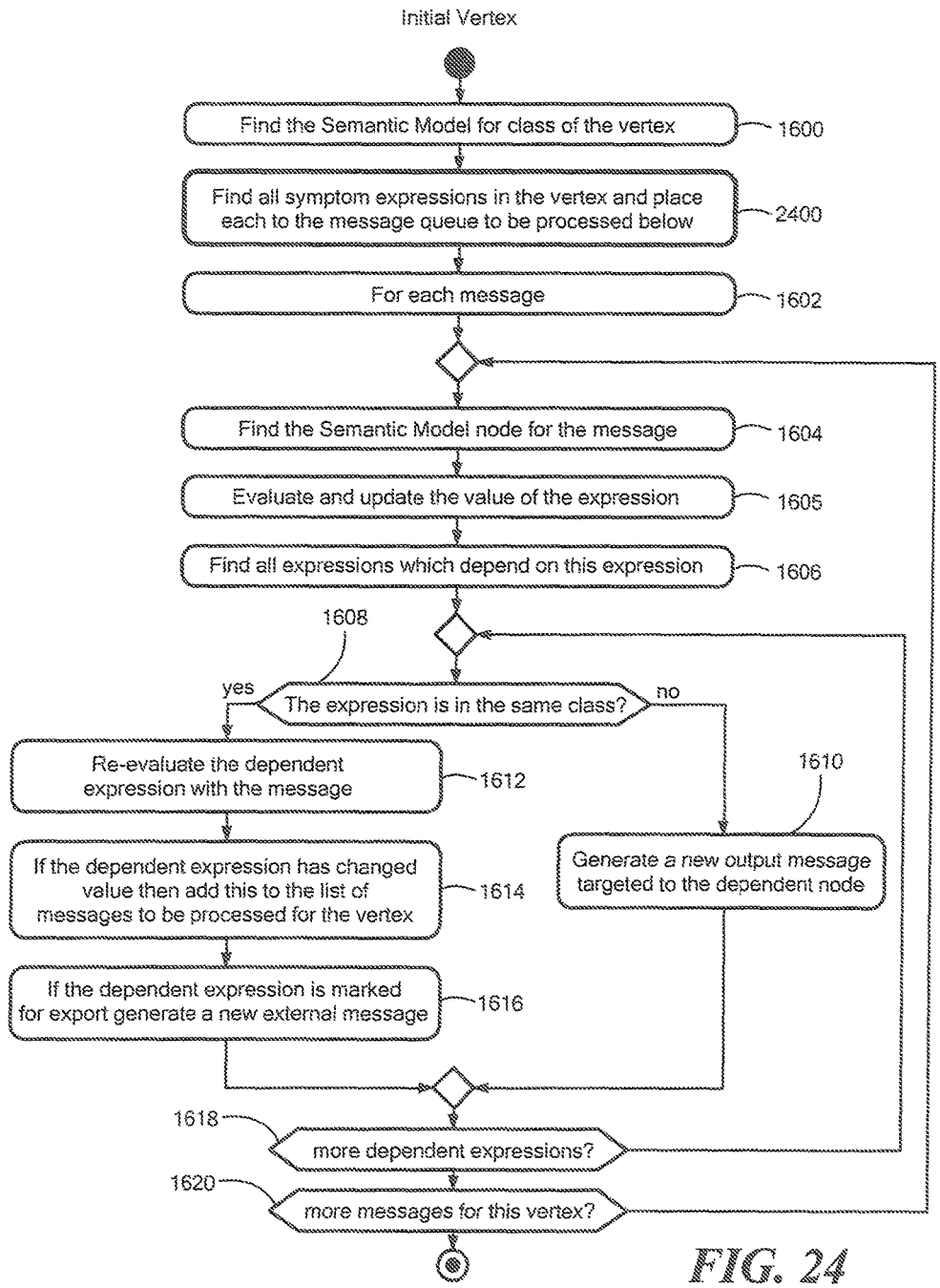
FIG. 24 is a flow diagram showing initial vertex processing.

FIG. 24 shows illustrative processing for the initial vertex processing that is used to initialize and propagate the symptom expressions at each vertex. Processing is substantially similar to the processing shown in FIG. 16. Where the 'normal' vertex processing takes a list of messages as input, the initial vertex processing internally constructs the list of messages as the symptom expressions defined in the domain model in step 2400.

An illustrative domain model for a data center system, such as an elastic converged storage system described above, is provided below in textual form with an illustrative impact definition. The keyword "impact" defines an impact expression, which refers to another Boolean expression. If the referred expression is true, then the impact expression is evaluated to be a representation of the referred expression and the enclosing object. If the referred expression is evaluated as false, then the impact expression is evaluated to nothing. The keyword "explains" defines the relationship between a problem and the expressions it impacts. Optionally, there can be an "if" statement in the "explains" statement (as illustrated) to indicate that the impact is only included if the condition is true.

```
. . .
class ProtectionDomain {
   . . .
   computed PotentialDataLoss = sum(Child-
>SDS::UnavailableDeviceCount) >=2
      shared relationship Child, SDS(100)
      impact PotentialDataLossImpact = PotentialDataLoss
   . . .
}
class SDS {
   . . .
   relationship Child, StorageDevice(32)
   relationship Parent, ProtectionDomain(1)
   computed UnavailableDeviceCount = count(Child-
>StorageDevice::IsUnavailable)
      problem Down (prior: 0.0001) = Child-
>StorageDevice::UnavailableSymptom (causal: 0.9),
                  Parent-
>ProtectionDomain::PotentialDataLossImpact explains if
UnavailableDeviceCount >0
   . . .
}
class StorageDevice {
   . . .
   external IsUnavailable
   symptom UnavailableSymptom = IsUnavailable {
      loss = 0.1
      spurious = 0.05
   }
   . . .
}
. . .
```

Figure 25:
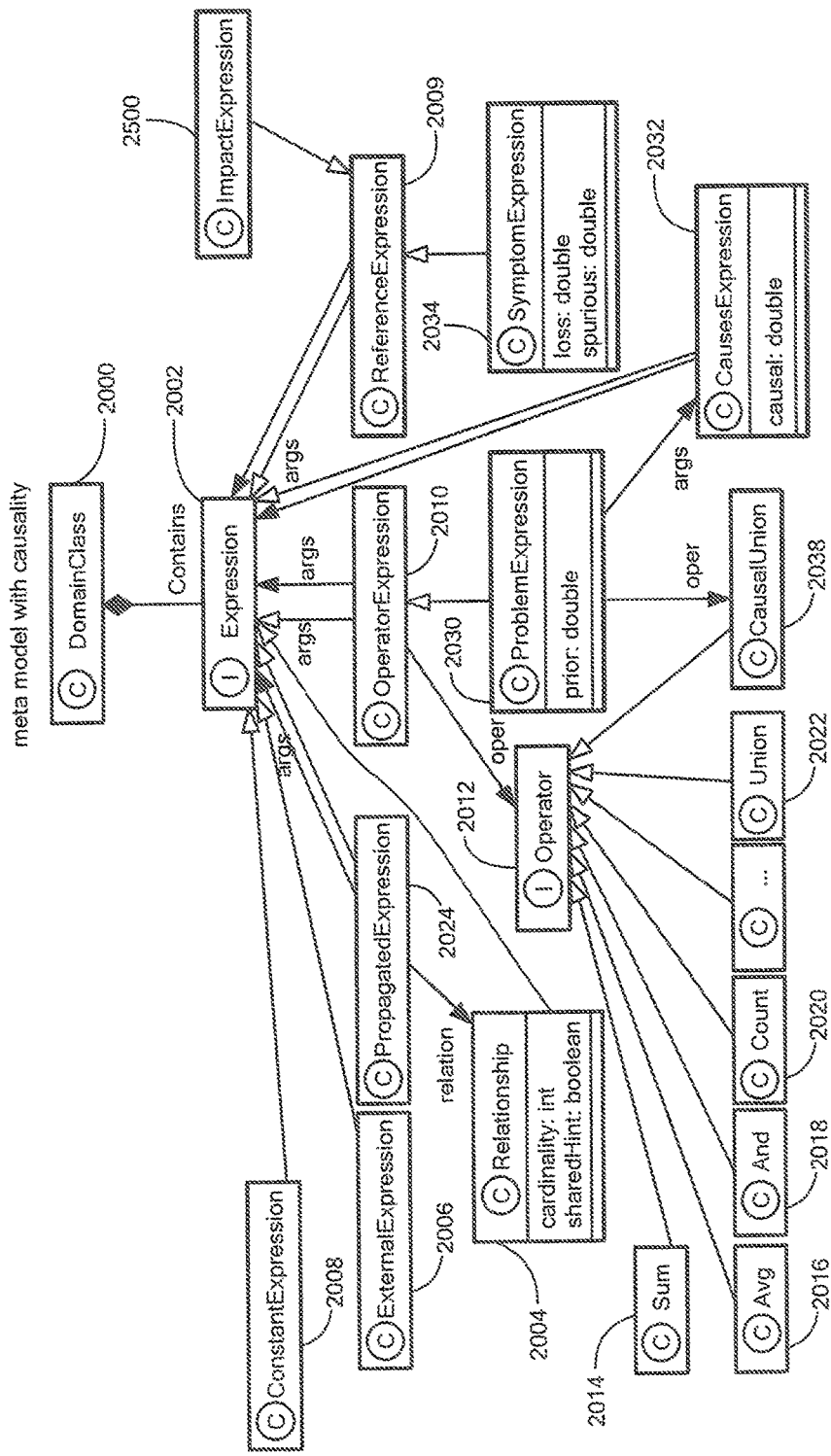
FIG. 25 is a representation of a meta model with causality and impact.

FIG. 25 shows an illustrative meta model with both impact and causality. FIG. 25 is substantially similar to the metal model of FIG. 20 with the addition of impact expression 2500 which is used for impact calculation as described below. The impact expression 2036 and the symptom expression 2034 share a common schematic, which is captured by their parent class reference expression 2009. A reference expression 2009 refers to another defined expression, and when evaluated, it returns a representation of the referred expression and the enclosing object.

Figure 26:
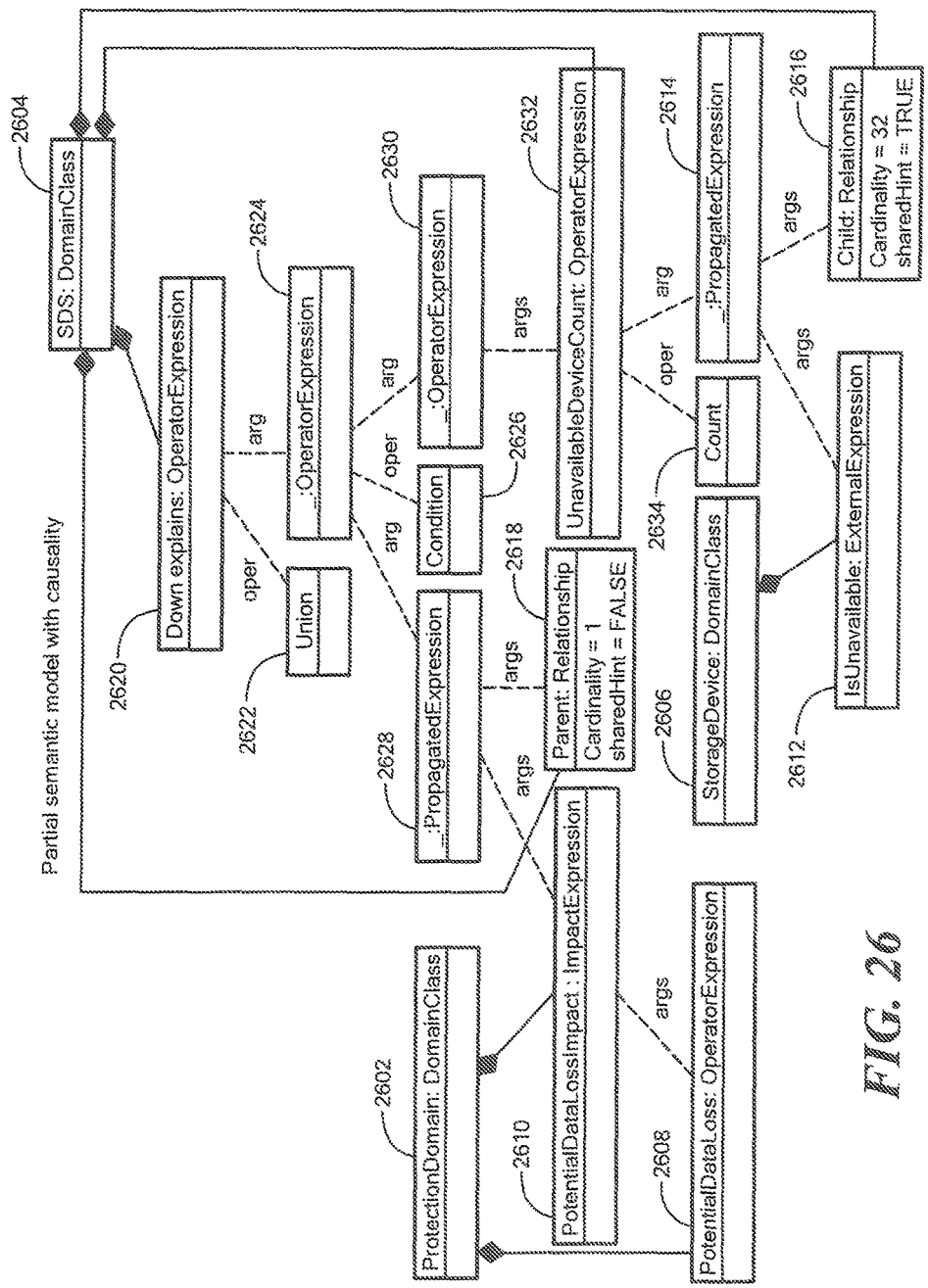
FIG. 26 is a representation of a partial semantic model with impact.

FIG. 26 shows an illustrative instantiation 2600 of a portion of the elastic converged storage system domain model with illustrative impact. It should be noted that non-impact related expressions are omitted to more easily show expressions related to impact. The symbol "_" appearing in some instantiated expressions indicates that the expression does not exist in the textual model. They are instantiated to facilitate the impact calculation using the same expression evaluation framework.

As can be seen, the classes from the textual domain model are shown including protection domain 2602, SDS 2604, and storage device 2606. The protection domain 2602 is coupled to a potential data loss 2608 operator expression and a potential data loss impact 2610 impact expression, which receives arguments from the potential data loss 2608 operator expression.

The storage device 2606 class is coupled to an IsUnavailable 2612 external expression, which provides arguments to a propagated expression 2614 that receives arguments from a child 2616 relationship of the SDS class 2604.

The SDS class 2604 is coupled to a parent 2618 relationship, a down explains 2620 operator expression, an UnavailableDeviceCount 2622 operator expression, and the child 2616 relation. The down explains 2620 operator expression receives a union 2622 operator and arguments from an operator expression 2624, which receives a condition 2626 operator and arguments from a propagated expression 2628 and an operator expression 2630. The propagated expression 2628 receives arguments from the potential data loss impact 2610 impact expression and from the parent 2618 relationship. The operator expression 2630 receives arguments from an UnavailableDeviceCount 2632 operator expression, which is coupled to the SDS class 2604. The UnavailableDeviceCount 2632 operator expression receives a count 2634 and arguments from the propagated expression 2614.

In embodiments, impacts for each problem are pre-calculated and can be stored in the same graph store used by the expression engine, or somewhere that can be shared with the impact engine to respond to queries. Given the impact statements in the domain model and the instantiation of the corresponding semantic model as described above, impact processing can be automatically supported by the expression engine with its distributed expression propagation described above. The impacts for each problem will be updated seamlessly as attribute changes come in.

FIGS. 27A-D illustrate the population of the impacts in a sequence of first and second StorageDevice IsUnavailable events for a Protection Domain class having child relationship SDS1 and SDS2. Storage device 1-1 and storage device 1-2 have child relationships with the SDS1 and storage device 2-1 and storage device 2-2 have child relationships with SDS2.

Figure 27A:
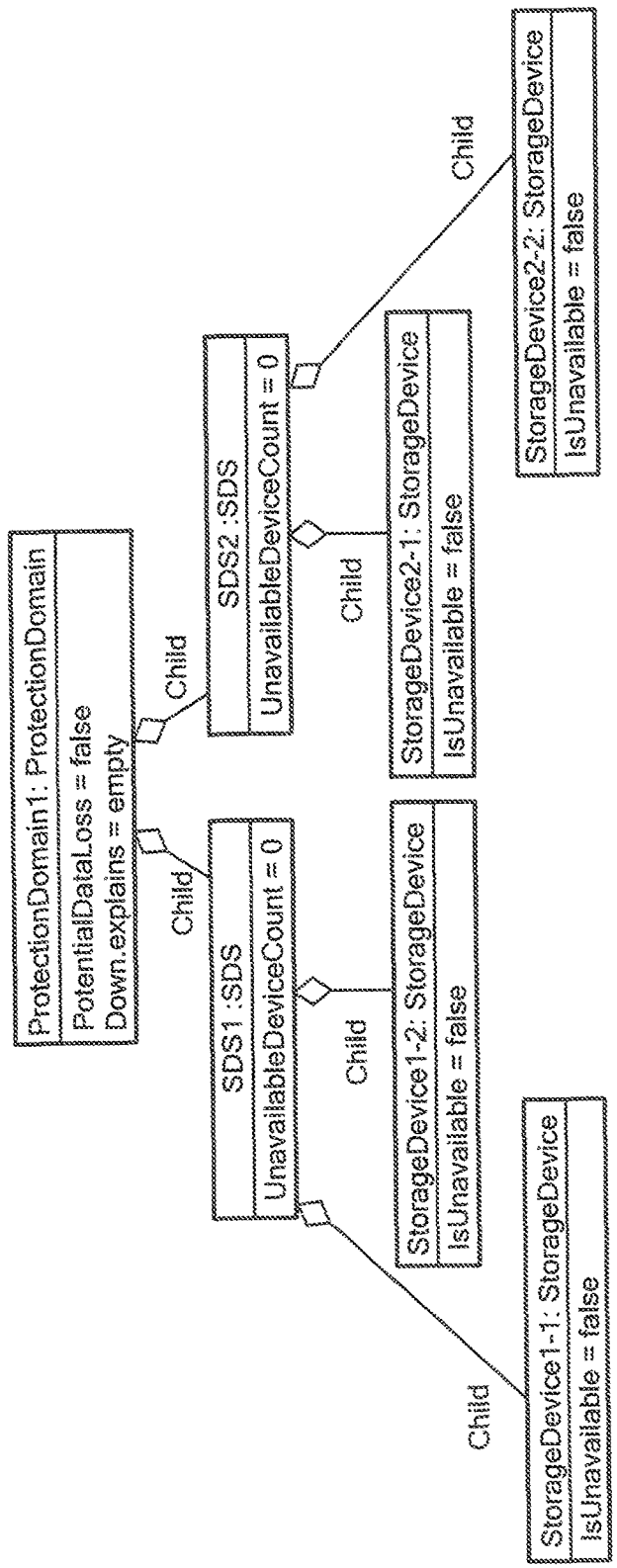
FIGS. 27A-D are a representation of populating impacts for events in a class.

FIG. 27A shows the initial state where no storage device (1-1, 1-2, 2-1, 2-2) is unavailable. In that case, the ProtectionDomain has the PotentialDataLoss evaluated to false. The Down Explains expression is an empty set.

Figure 27B:
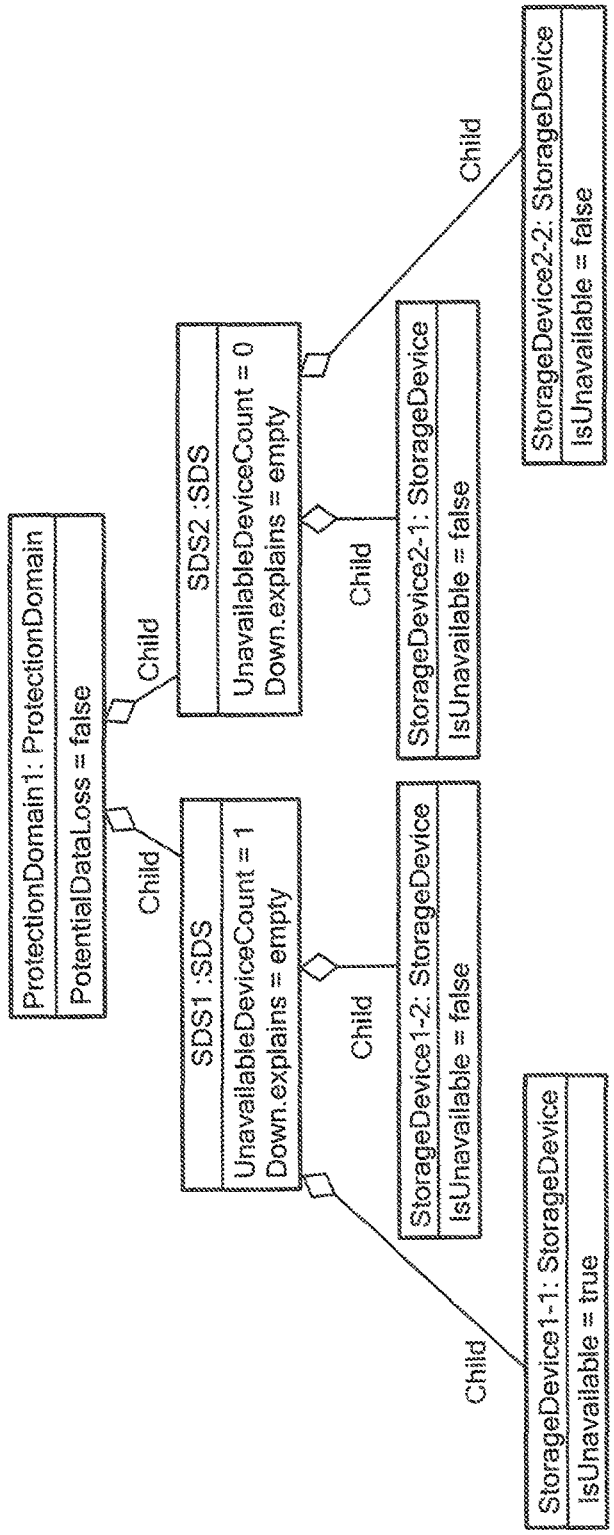

FIG. 27B shows what happens when the StorageDevice 1-1 becomes unavailable. In that case, SDS1 has its UnavailableDeviceCount evaluated to 1, but the ProtectionDomain PotentialDataLoss expression is still false. Hence, the Down.explains expression in the first and second SDS1, SDS2 is still an empty set.

Figure 27C:
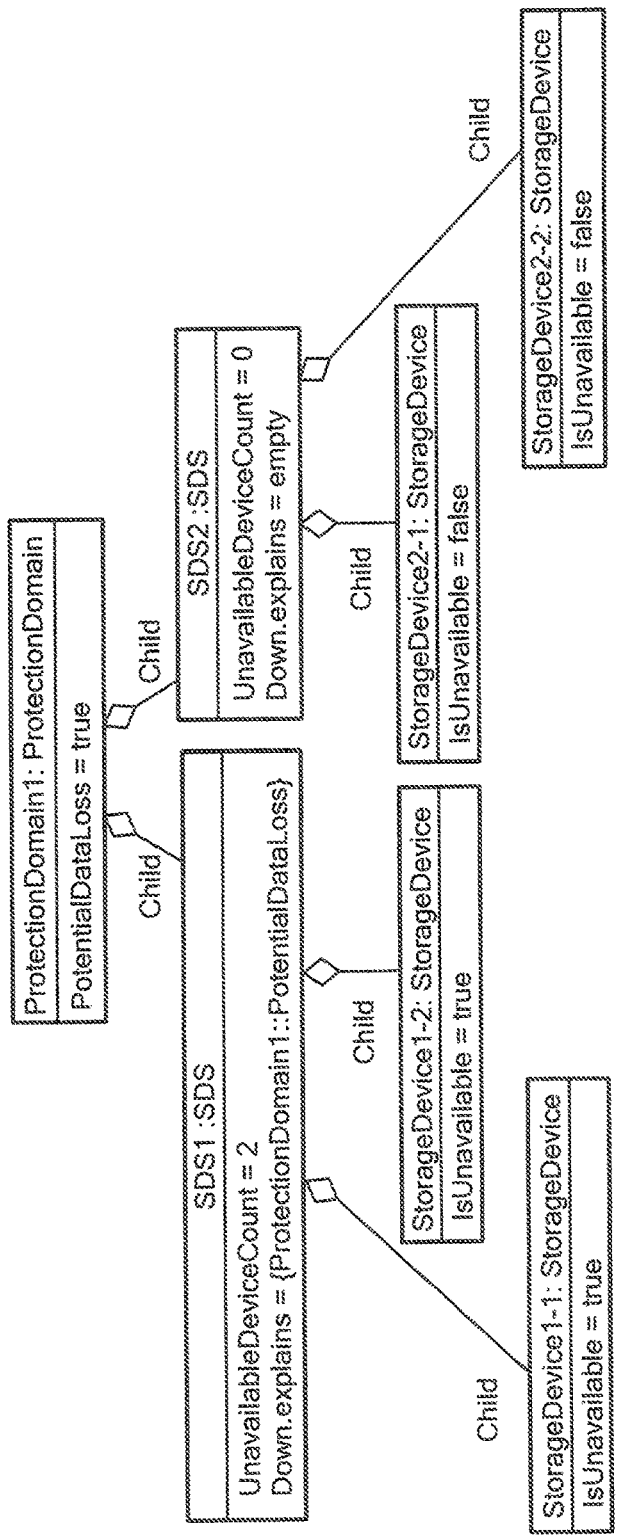

FIG. 27C shows what happens when a second storage device, shown as storage device 1-2, becomes unavailable. SDS1 has its UnavailableDeviceCount evaluated to 2, and thus the ProtectionDomain class PotentialDataLoss now becomes true, which will now be included in the Down.explains.

Figure 27D:
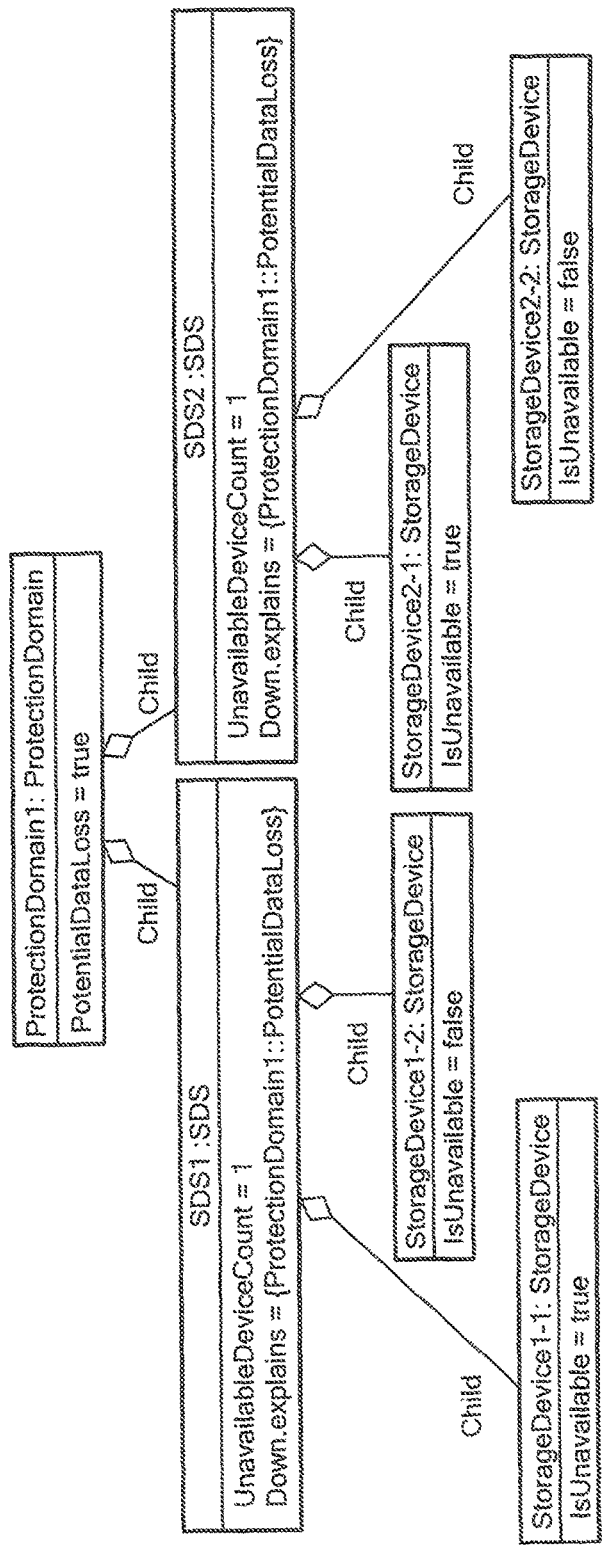

FIG. 27D shows, alternatively, when two storage devices 1-1 and 2-1, one each from SDS1 and SDS2, become unavailable. In this case, SDS1 and SDS2 contribute to the PotentialDataLoss of the ProtectionDomain. Therefore, according to the impact model, both Down.explains expressions of SDS1 and SDS2 include the ProtectionDomain PotentialDataLoss expression.

As described above, processing requires maintaining a list of impacted expressions for each problem whether or not that problem is active or not. In alternative embodiment the system maintains a list of impacted expressions just for each active problem, but it is not incremental and runs periodically against the full set of active problems to refresh the list of impacts. This alternative process includes first and second passes.

In a first pass, processing begins with a set of active problems and their corresponding topology objects, then traverses the impact relationship along the graph to propagate the activeness, in parallel, to the set of impacted expressions. Heuristics can be used to cut off the traversal if any condition along the propagation is evaluated false. After this pass, we will obtain a whole set of impacted expressions for all problems, but we do not have for each problem the corresponding subset of impacted expressions.

A second pass reverses the traversal in the first pass. It starts with the set of impacted expressions obtained in the first pass, and traverses backward along the graph towards the problems. During this reversed traversal, the impacted expressions are accumulated at each hop. When the traversal terminates at each problem expression, it will have accumulated a list of impacted expressions for that problem.

In another aspect of the invention, a system performs codebook correlation using graph processing. As noted above, a system can determines states of the system and components from inputs including topological data representing managed objects and inputs for a stream of telemetry data coming from the managed objects. The expressions needed to compute the current state are evaluated against the changing graph and telemetry stream in near-real time. The output of these expressions can be then fed to a reasoning engine which can determine the most likely set of faults explaining the observed state. This computation must scale to total of the sizes of the systems under management. In embodiments, vertex centric processing is used to decompose graph processing problems to enabling scaling. Event correlation using codebook processing includes determining a most probable set of problems (hypothesis) to explain a set of observed symptoms.

Figure 28:
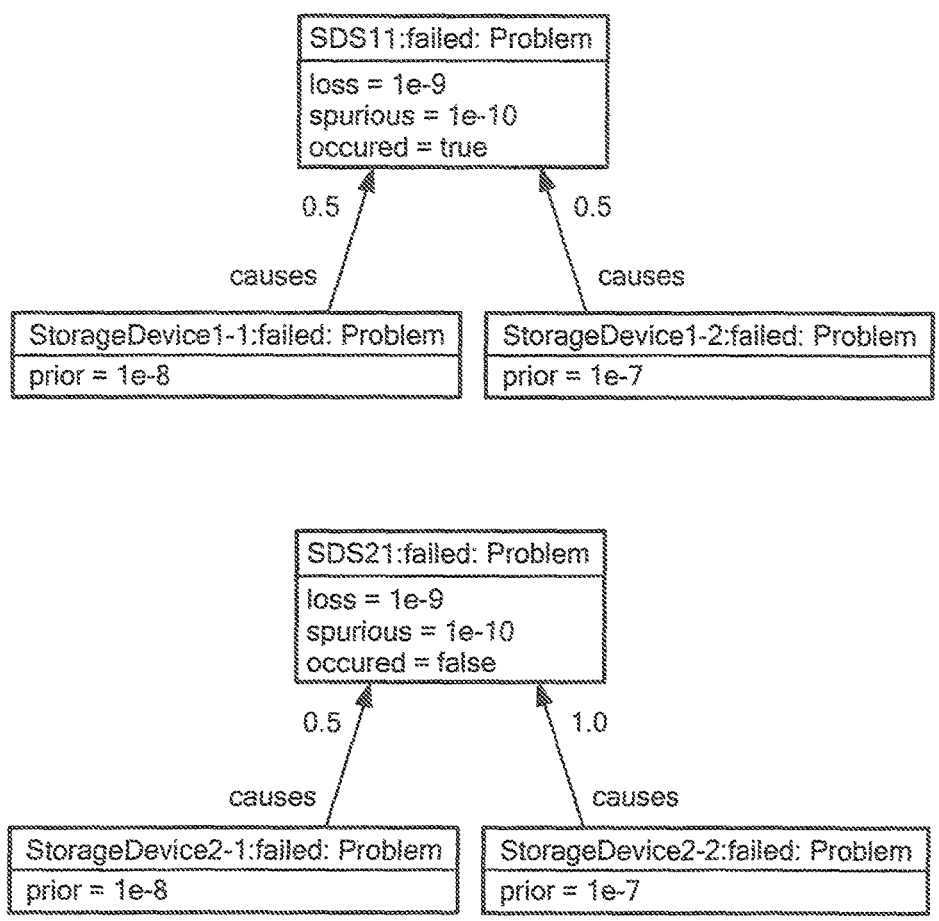
FIG. 28 is a representation of an input to a codebook processing module.

FIG. 28 shows an illustrative input to codebook processing module as correlation matrix. A first object SDS11 has a first child StorageDevice 1-1 and a second child StorageDevice 1-2. Similarly, a second object SDS21 has a first child StorageDevice2-1 and a second child StorageDevice2-2. The storage devices 1-1, 1-2, 2-1, 2-2 are causally related to the respective SDS11, SDS21.

Figure 29:
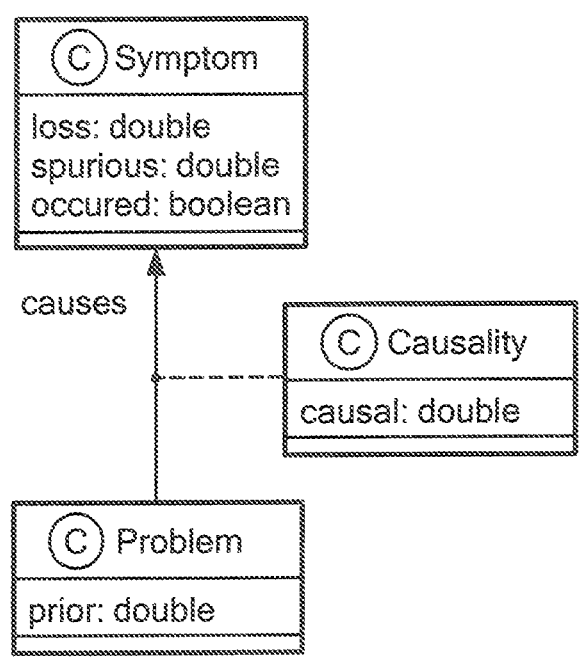
FIG. 29 is a metamodel representation of the input of FIG. 28.

Inputs that are used for processing include a set of observable symptoms with associated probability of symptom loss or spurious observation, shown as loss=1e-9, spurious=1e-10 in SDS11, and a set of potential problems with associated prior probability of occurrence, shown as prior=1e-8 in StorageDevice 1-1. A further input includes causal connections between problems and symptoms along with a causal probability, shown as 0.5 in the illustrated embodiment. Another input includes a mapping from symptoms to a boolean "occurred" value (shown as occurred=true/false) indicating whether or not the symptom has been observed or not. This input is expected to change frequently. In FIG. 29 the input is represented as illustrative metamodel having symptom, causality, and problem, with listed types.

In embodiments, we can define the following notation. The set of problems is represented as $P=\{p_1, \ldots, p_n\}$ while the symptoms are represented as $S=\{s_1, \ldots, s_n\}$. The causal probability from $p_i$ to $s_j$ is represented as $c_i^j$. Then $sp(s_i)$, $l(s_i)$, $o(s_i)$ are the spurious, loss and occurred values respectively associate with $s_i$. We also say that the set of occurred symptoms can be represented as $O=\{s_i | o(s_i)=true\}$, while $pr(p_i)$ is the prior probability associated with $p_i$. Finally, we define a hypothesis as a subset of the set of problems $H \subseteq P$.

Then we can state the following identities, where $RPA_O(H)$ is the relative probability of the hypothesis H given the set of observed symptoms O, and $UB_O(H)$ is an upper bound for all possible hypotheses which are supersets of H.

$$P(s_j | H) = \left(1 - \left(\prod_{p_i \in H} (1 - c_i^j)\right)(1 - sp(s_j))\right) \times (1 - l(s_j))$$

$$RPA_O(H) = \prod_{p_i \in H} \frac{pr(p)}{1 - pr(p)} \times \prod_{s_j \in O} P(s_j | H) \times \prod_{s_j \notin O} (1 - P(s_j | H))$$

$$UB_O(H) = \prod_{\substack{p_i \in H \\ pr(p_i) < 0.5}} \frac{pr(p)}{1 - pr(p)} \times \prod_{s_j \notin O} (1 - P(s_j | H))$$

In one embodiment of the invention, the goal is to find the i hypothesis having the highest values of $RPA_O(H)$ over all possible H for some integer value of i. Since the search space is exponential in n, various processing techniques can be used including heuristic processing. In one embodiment, a heuristic process is used (as described in Peng, Y. and Reggia, J. L. (1989), "A comfort measure for Diagnostic Problem Solving," which is incorporated herein by reference.

Figure 30:
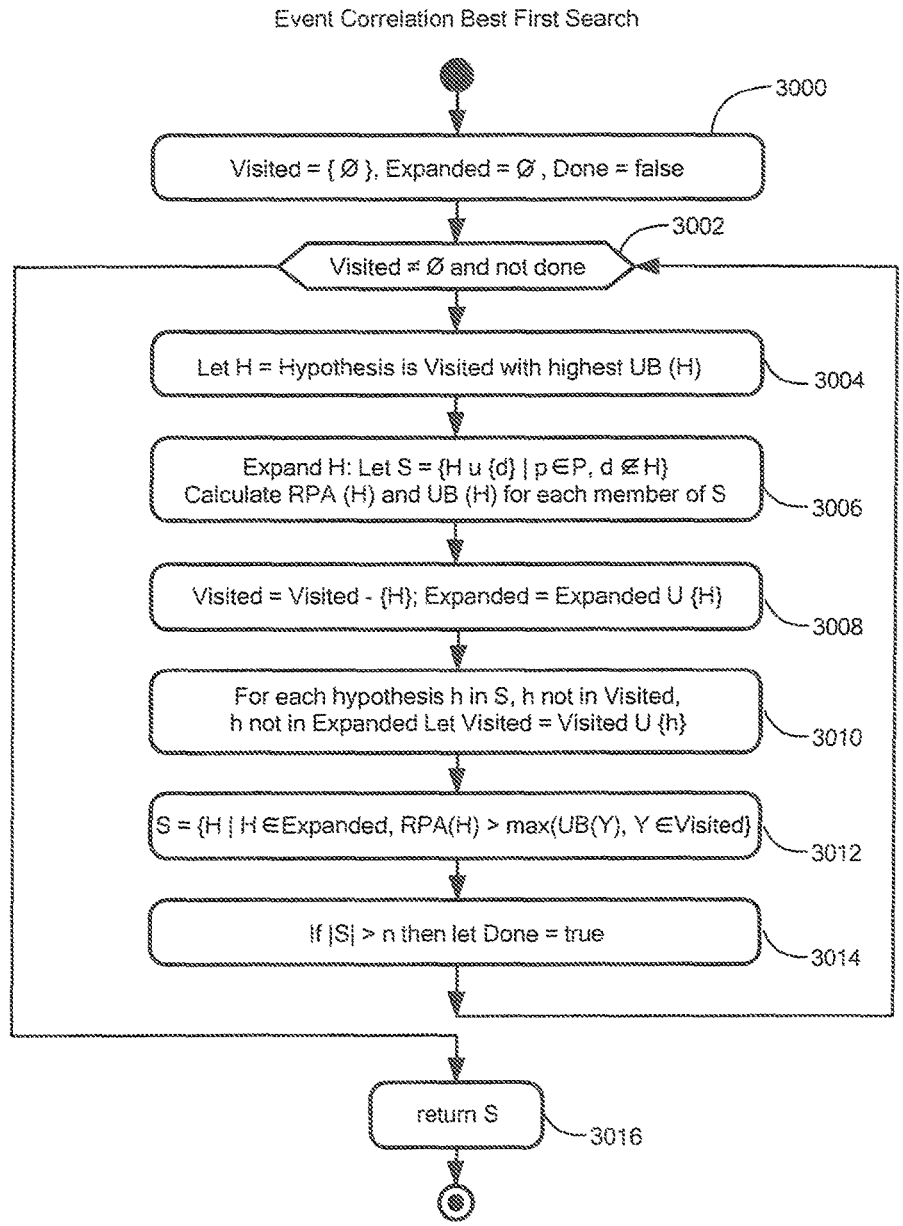
FIG. 30 is a flow diagram for event correlation best first search processing.

FIG. 30 shows an illustrative process for event correlation best first search using the above notation. In step 3000, the system is initialized and in step 3002, a hypothesis is visited. In step 3004, hypothesis H is visited having the highest upper bound UB(H). In step 3006, the hypothesis H is expanded such that for all symptoms in S the relative probability RPA(H union {s}) and the upper bound UB(H union {s}) is determined. In step 3008, the set of visited and expanded hypotheses is updated to reflect the expansion of H. In step 3010, for each hypothesis h in set of expanded hypotheses S, where that hypothesis has not been visited and not expanded, the set of visited hypotheses is updated to include h. In step 3012, a set of hypotheses S is formed including all expanded hypotheses having relative probability greater than the maximum upper bound of the visited hypotheses. In step 3014, if the number of hypotheses in S is greater than n, then processing is done. In step 3016, the selected hypotheses based on the relative probability processing is returned.

Figure 31:
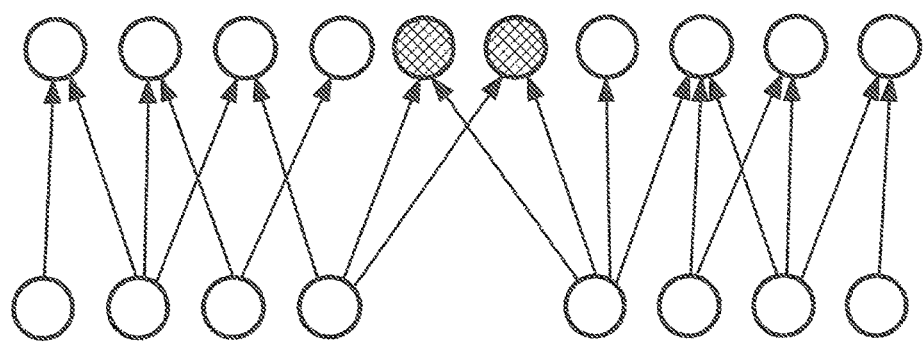
FIG. 31 is a representation of correlation graph partitioning.

FIG. 31 shows a performance optimization which can be performed to partition the correlation graph. If the darkened symptoms are not in the set of occurred Symptoms O with loss probability=0, then the two groups of problems are independent. The darkened symptoms can be removed and the two remaining partitions can be processed separately.

Embodiments of the invention enhances the 'expand' phase of the processing described above into a vertex-centric program for enabling large and high degree correlation graphs to be processed on a scale-out vertex-centric execution environment, thus improving performance. Furthermore, the 'expand' phase can be executed in parallel for all partitions of the graph, thereby further improving performance.

Figure 32:
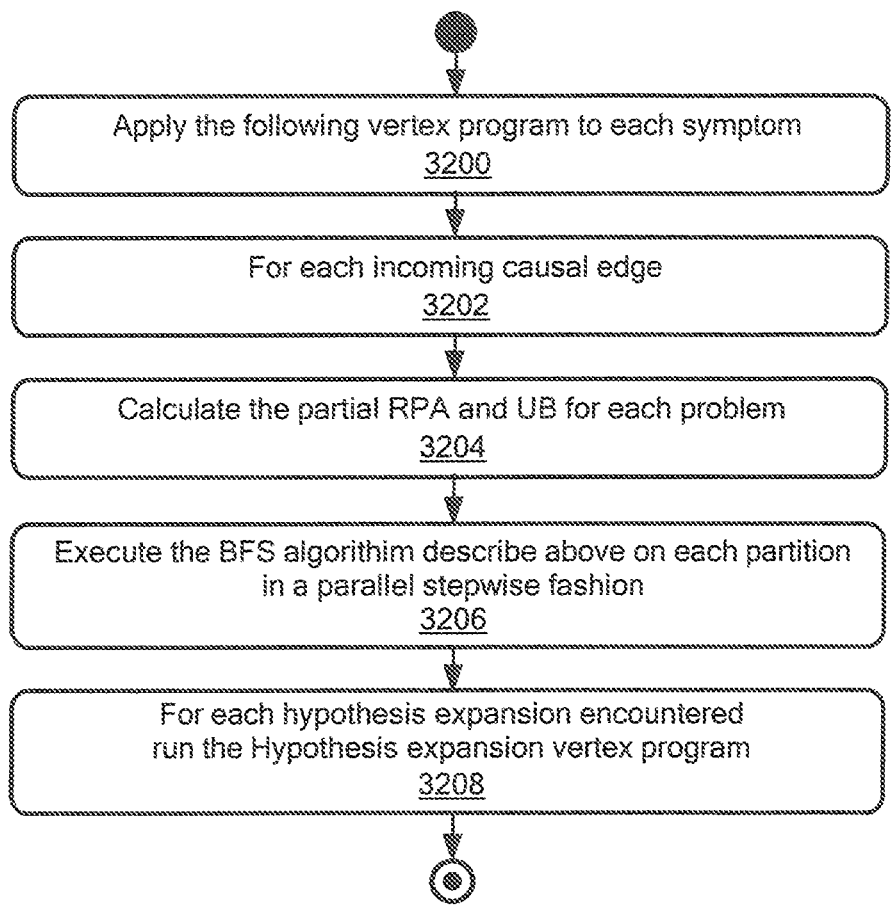
FIG. 32 is a flow diagram showing calculation of PRPA and PUC using vertex centric programming and of hypothesis expansion using vertex centric programming.

FIG. 32 shows a high level process for performing hypothesis expansion using vertex centric processing. After reading the correlation matrix sent by the expression engine (FIG. 18A), in step 3200, vertex processing is applied to each symptom. For each incoming causal edge 3202, in step 3204, the system calculates a partial relative probability (PRPA) and partial upper bound (PUB) for each problem, as described more fully below. In step 3206, best first search (BFS) processing is performed on each partition (FIG. 31) in a parallel stepwise fashion. In step 3208, hypothesis expansion vertex processing, which is described below, is performed for each hypothesis expansion in step 3206.

Consider a "partial RPA" (PRPA) and "partial UB" (PUB) for each problem $p_i \in P$. PRPA and PUB are the same as RPA and UB, except that only symptoms $s_j$ where $c_i^j > 0$ are considered.

$$PRPA_O(p_i) = \frac{pr(p_i)}{1 - pr(p_i)} \times \prod_{\substack{s_j \in O \\ c_i^j > 0}} P(s_j | H) \times \prod_{\substack{s_j \notin O \\ c_i^j > 0}} (1 - P(s_j | \{p_i\}))$$

$$PUB_O(p_i) = \prod_{pr(p_i) < 0.5} \frac{pr(p_i)}{1 - pr(p_i)} \times \prod_{\substack{s_j \notin O \\ c_i^j > 0}} (1 - P(s_j | \{p_i\}))$$

Step 3204 requires the calculation of PRPA and PUB for each problem. In illustrative embodiments these calculations are achieved using vertex centric processing, as described below:
1. Apply the following vertex processing to each symptom
   a. For each incoming edge labeled $c_i^j$, calculate $P(s_j|\{p_i\})$. This is possible because the calculation of $P(s_j|\{p_i\})$ only requires knowledge of $c_i^j$, $sp(s_j)$, and $l(s_j)$ which are all available at the symptom vertex $s_j$.
   b. If $s_j \in O$ then send the message $RPA=P(s_j|\{p_i\})$, $UB=1$; otherwise send $RPA=1-P(s_j|\{p_i\})$, $UB=1-P(s_j|\{p_i\})$
   c. Combine all messages for the same problem vertex by multiplying together all RPA and UB values respectively.

At each problem vertex $p_i$ complete the calculation of PRPA and PUB, by multiplying the PRPA message product by $pr(p_i)/1-pr(p_i)$ and the PUB message by $pr(p_i)/1-pr(p_i)$ if $pr(p_i) < 0.5$.

Step 3204 can also be run incrementally as symptom states change. For example, suppose that at a given vertex, the value of the message that it send is a, when the symptom has occurred, and b otherwise. In this case, when the symptom goes from an occurred state of true to the state false, the message b/a can be sent to effectively cancel out the message previously sent and update all related problems to the value required by the new state of the symptom.

In one embodiment, step 3208 hypothesis expansion can proceed as follows:
1. Apply the following vertex processing to problem vertices which are members of the hypothesis H.
   a. For each outgoing edge labeled $c_i^j$, send the message $(1-c_i^j)$.
   b. At each symptom node, combine the incoming edge values using multiplication.

2. Apply the following vertex program to each symptom node that receives a message
   a. For each incoming edge labeled $c_i^j$, calculate $P(s_j|\{p_i\})$, $P(s_j|H)$, $P(s_j|H \cup \{p_i\})$.
   b. If $s_j \in O$ then send the message $$RPA = \frac{P(s_j | H \cup \{p_i\})}{P(s_j | \{p_i\}) \times P(s_j | H)}, \ UB = 1$$

otherwise send $$RPA = \frac{1 - P(s_j | H \cup \{p_i\})}{(1 - P(s_j | \{p_i\})) \times (1 - P(s_j | H))},$$

$$UB = \frac{1 - P(s_j | H \cup \{p_i\})}{(1 - P(s_j | \{p_i\})) \times (1 - P(s_j | H))}$$

c. Combine messages for the same problem vertex by multiplying together all RPA and UB values respectively.
3. Apply the following vertex program to each problem receiving an incoming message:
   a. If the problem $p_i \notin H$, then multiply the incoming RPA and UC values by the previously calculate PRPA and PUB values for the problem. Otherwise, ignore the message.
4. For problems not already part of H, multiple the PRPA and PUB values for $p_i$ just calculated to the RPA and UB values for H to get $RPA_O(H \cup \{p_i\})$ and $UC_O(H \cup \{p_i\})$ respectively.

Note that the hypothesis expansion process can be applied to a hypothesis from each partition in parallel, thus enabling hypothesis expansion to proceed in parallel for all partitions.

Figure 33:
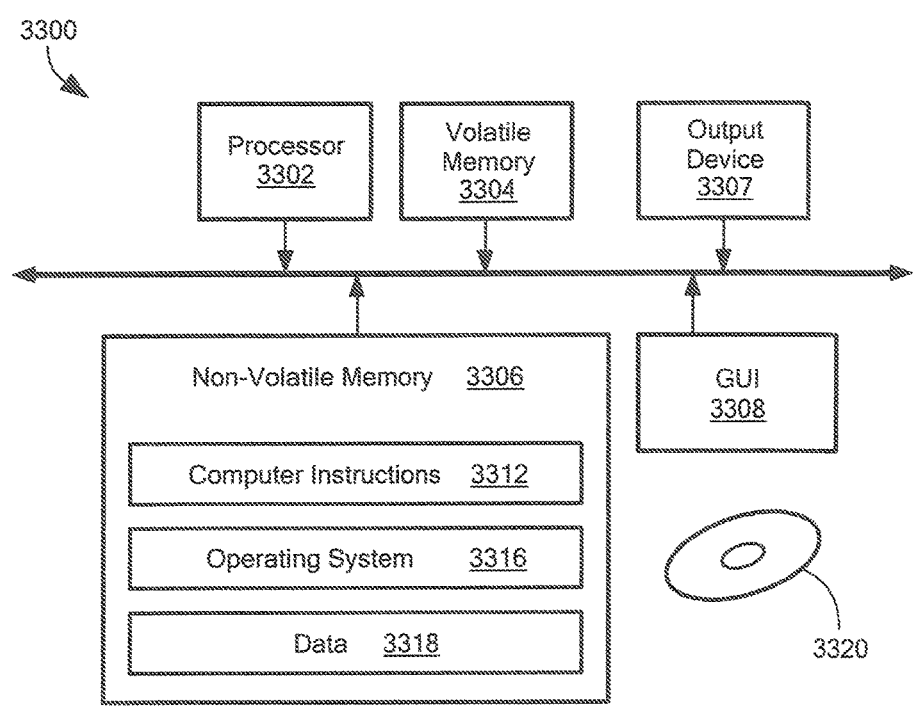
FIG. 33 is a schematic representation of an illustrative computer that can perform at least a portion of the processing described herein.

FIG. 33 shows an exemplary computer 3300 that can perform at least part of the processing described herein. The computer 3300 includes a processor 3302, a volatile memory 3304, a non-volatile memory 3306 (e.g., hard disk), an output device 3307 and a graphical user interface (GUI) 3308 (e.g., a mouse, a keyboard, a display, for example). The non-volatile memory 3306 stores computer instructions 3312, an operating system 3316 and data 3318. In one example, the computer instructions 3312 are executed by the processor 3302 out of volatile memory 3304. In one embodiment, an article 3320 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

All publications and references cited herein are expressly incorporated herein by reference in their entirety.

What is claimed is:

1. A method of performing event correlation using codebook processing including determining a most probable set of problems for observed symptoms in a system comprising an interconnected plurality of devices, each respective interconnected device providing respective data storage that is shareable with the other interconnected devices, the method comprising;

receiving, in real time, a correlation matrix for the system;

defining hypotheses as a subset of problems having observed symptoms in the system based on the correlation matrix, wherein there is a causal probability from problem set to symptoms;

determining a partial relative probability for each of the problems by parallel vertex processing including:

for each incoming edge for a problem vertex, determining the partial relative probability from the symptom and the problem for the problem vertex;

sending first messages that include the determined partial relative probability; and combining first messages for the same problem vertex by multiplication;

partitioning the correlation matrix into a plurality of partitions according to the observed symptoms;

performing a best first search on each partition of the system, wherein determining an expansion of visited hypothesis nodes and their relative probabilities and upper bounds is calculated using parallel vertex processing including:

for outgoing edges for a problem vertex in the hypothesis, determining a sum of 1 and the additive inverse of the causal probability, sending second messages that include the determined sum, and combining second messages for the same vertex using multiplication;

for each outgoing edge for a symptom, determining a probability of that symptom's occurred value given the hypothesis, divided by the probability given the hypothesis unioned with a set containing the problem attached to an outgoing edge, divided by the probability given the problem attached to the outgoing edge, and determining the upper bound on those probabilities for the same;

sending third messages of the compute probabilities and upper bounds; and combining third messages for the same problem vertex using multiplication;

for each problem receiving an incoming first, second or third message, combining the respective incoming first, second, or third message with the partial probability and upper bounds for that problem and the probability and upper bound for the hypothesis using multiplication to form the probability and upper bound for a child of the hypothesis determining, based at least in part on the hypothesis and on the probability and upper bound for a child of the hypothesis, a real-time operational state of the system, the real-time operational state including information indicating, in real-time, the impacts of detected problems in the system; and dynamically and automatically rebalancing the shareable data storage among the interconnected plurality of devices of the system, based at least in part on the real-time operational state, to compensate for the impacts of the detected problems.

2. The method according to claim 1, wherein the partial relative probability for each of the problems is updated incrementally as the set of occurred symptoms change.

3. A method according to claim 1, wherein the correlation matrix is partitioned according to the observed set of symptoms and calculation of the relative probability of a hypothesis in each partition is performed in parallel.

4. The method of claim 1, wherein the system comprises a plurality of hosts interconnected over a network.

5. The method of claim 1, wherein the determination of the probable set of problems occurs in real-time, and wherein each symptom comprises information relating to a real-time operational state of the system.

6. The method of claim 1 wherein the correlation matrix is created based at least in part on a set of dynamic, real time data, the set of dynamic, real-time data comprising topological data representing the plurality of hosts and a set of telemetry data from the plurality of hosts.

7. The method of claim 1, further comprising monitoring one or more real-time states of the system based at least in part on one or more of the first messages, second messages, third messages, and the hypotheses.

8. A system for performing event correlation using codebook processing including determining a most probable set of problems for observed symptoms in a system comprising a plurality of interconnected devices, each respective interconnected device providing respective data storage that is shareable with the other interconnected devices, the system comprising:

a memory and a processor configured to:

receive, in real time, a correlation matrix for the system;

define hypotheses as a subset of problems having observed symptoms in the system based on the correlation matrix, wherein there is a causal probability from problem set to symptoms;

determine a partial relative probability for each of the problems by parallel vertex processing including:
  for each incoming edge for a problem vertex, determine the partial relative probability from the symptom and the problem for the problem vertex;
  send first messages that include the determined partial relative probability; and
  combine first messages for the same problem vertex by multiplication;

partition the correlation matrix into a plurality of partitions according to the observed symptoms;

perform a best first search on each partition of the system, wherein determining an expansion of visited hypothesis nodes and their relative probabilities and upper bounds is calculated using parallel vertex processing including:
  for outgoing edges for a problem vertex in the hypothesis, determine a sum of 1 and the additive inverse of the causal probability, sending second messages that include the determined sum, and combining second messages for the same vertex using multiplication;
  for each outgoing edge for a symptom, determine a probability of that symptom's occurred value given the hypothesis, divided by the probability given the hypothesis unioned with a set containing the problem attached to an outgoing edge, divided by the probability given the problem attached to the outgoing edge, and determining the upper bound on those probabilities for the same;
  send third messages of the compute probabilities and upper bounds; and
  combine third messages for the same problem vertex using multiplication;

for each problem receiving an incoming first, second or third message, combine the respective incoming first, second, or third message with the partial probability and upper bounds for that problem and the probability and upper bound for the hypothesis using multiplication to form the probability and upper bound for a child of the hypothesis determine, based at least in part on the hypothesis and on the probability and upper bound for a child of the hypothesis, a real-time operational state of the system, the real-time operational state including information indicating, in real-time, the impacts of detected problems in the system; and dynamically and automatically rebalance the shareable data storage among the interconnected plurality of devices of the system, based at least in part on the real-time operational state, to compensate for the impacts of the detected problems.

9. The system according to claim 8, wherein the partial relative probability for each of the problems is updated incrementally as the set of occurred symptoms change.

10. A system according to claim 8, wherein the correlation matrix is partitioned according to the observed set of symptoms and calculation of the relative probability of a hypothesis in each partition is performed in parallel.

11. The system of claim 8, wherein the system comprises a plurality of hosts interconnected over a network.

12. The system of claim 8, wherein the determination of the probable set of problems occurs in real-time, and wherein each symptom comprises information relating to a real-time operational state of the system.

13. The system of claim 8, wherein the correlation matrix is created based at least in part on a set of dynamic, real-time data, the set of dynamic real-time data comprising topological data representing the plurality of hosts and a set of telemetry data from the plurality of hosts.

14. The system of claim 8, wherein the processor is configured to monitor one or more real-time states of the system based at least in part on one or more of the first messages, second messages, third messages, and the hypotheses.

15. An article, comprising:
  a non-transitory storage medium comprising stored instructions that enable a system for performing event correlation using codebook processing including determining a most probable set of problems for observed symptoms in a system comprising a plurality of interconnected devices, each respective interconnected device providing respective data storage that is shareable with the other interconnected devices, the stored instructions configured to:

receive, in real time, a correlation matrix for the system;

define hypotheses as a subset of problems having observed symptoms in the system based on the correlation matrix, wherein there is a causal probability from problem set to symptoms;

determine a partial relative probability for each of the problems by parallel vertex processing including:
  for each incoming edge for a problem vertex, determine the partial relative probability from the symptom and the problem for the problem vertex;
  send first messages that include the determined partial relative probability; and
  combine first messages for the same problem vertex by multiplication;

partition the correlation matrix into a plurality of partitions according to the observed symptoms;

perform a best first search on each partition of the system, wherein determining an expansion of visited hypothesis nodes and their relative probabilities and upper bounds is calculated using parallel vertex processing including:
  for outgoing edges for a problem vertex in the hypothesis, determine a sum of 1 and the additive inverse of the causal probability, sending second messages that include the determined sum, and combining second messages for the same vertex using multiplication;
  for each outgoing edge for a symptom, determine a probability of that symptom's occurred value given the hypothesis, divided by the probability given the hypothesis unioned with a set containing the problem attached to an outgoing edge, divided by the probability given the problem attached to the outgoing edge, and determining the upper bound on those probabilities for the same;
  send third messages of the compute probabilities and upper bounds; and
  combine third messages for the same problem vertex using multiplication;

for each problem receiving an incoming first, second or third message, combine the respective incoming first, second, or third message with the partial probability and upper bounds for that problem and the probability and upper bound for the hypothesis using multiplication to form the probability and upper bound for a child of the hypothesis;

determine, based at least in part on the hypothesis and on the probability and upper bound for a child of the hypothesis, a real-time operational state of the system, the real-time operational state including information indicating, in real-time, the impacts of detected problems in the system; and dynamically and automatically rebalance the shareable data storage among the interconnected plurality of devices of the system, based at least in part on the real-time operational state, to compensate for the impacts of the detected problems.

16. The article according to claim 15, wherein the partial relative probability for each of the problems is updated incrementally as the set of occurred symptoms change.

17. The article according to claim 15, wherein the correlation matrix is partitioned according to the observed set of symptoms and calculation of the relative probability of a hypothesis in each partition is performed in parallel.

18. The article of claim 15, wherein the determination of the most probable set of problems takes place in real-time and wherein each symptom comprises information relating to a real-time operational state of the system.

19. The article of claim 15 wherein, the correlation matrix is created based at least in part on a set of dynamic, real-time data, the set of dynamic real-time data comprising topological data representing the plurality of hosts and a set of telemetry data from the plurality of hosts.

20. The article of claim 15, wherein the stored instructions are configured to monitor one or more real-time states of the system based at least in part on one or more of the first messages, second messages, third messages, and the hypotheses.

* * * * *